(12) United States Patent
Morimoto et al.

(10) Patent No.: US 9,269,169 B2
(45) Date of Patent: Feb. 23, 2016

(54) VEHICLE DISPLAY APPARATUS AND VEHICLE DISPLAY CONTROL UNIT

(71) Applicant: DENSO CORPORATION, Kariya, Aichi-pref. (JP)

(72) Inventors: Hiroshi Morimoto, Anjo (JP); Takeshi Kawashima, Nisshin (JP); Hiroya Takikawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 171 days.

(21) Appl. No.: 14/059,869

(22) Filed: Oct. 22, 2013

(65) Prior Publication Data

US 2014/0111540 A1      Apr. 24, 2014

(30) Foreign Application Priority Data

Oct. 23, 2012  (JP) .................................. 2012-234157
Oct. 30, 2012  (JP) .................................. 2012-238782

(51) Int. Cl.
*G06T 11/20*     (2006.01)
*B60K 35/00*     (2006.01)

(52) U.S. Cl.
CPC ................. *G06T 11/20* (2013.01); *B60K 35/00* (2013.01); *B60K 2350/352* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 4,789,822 A | 12/1988 | Ohmatoi et al. | |
| 6,291,906 B1 * | 9/2001 | Marcus et al. | ............... 307/10.1 |
| 6,487,700 B1 | 11/2002 | Fukushima | |
| 7,073,125 B1 * | 7/2006 | Nystrom et al. | ............... 715/703 |
| 7,966,123 B2 * | 6/2011 | Watanabe et al. | ............. 701/429 |
| 2002/0186228 A1 | 12/2002 | Kobayashi et al. | |
| 2007/0078598 A1 | 4/2007 | Watanabe et al. | |
| 2007/0150187 A1 | 6/2007 | Kawakami et al. | |
| 2007/0157869 A1 * | 7/2007 | Takato | .......................... 116/286 |
| 2007/0262854 A1 * | 11/2007 | Colburn et al. | ............... 340/438 |
| 2008/0309475 A1 * | 12/2008 | Kuno et al. | .................... 340/462 |
| 2010/0175014 A1 * | 7/2010 | Obradovich | ................... 715/771 |
| 2011/0163864 A1 * | 7/2011 | Watanabe et al. | ............. 340/441 |

(Continued)

FOREIGN PATENT DOCUMENTS

| | | |
|---|---|---|
| JP | 63-058112 | 3/1988 |
| JP | 2000-267881 | 9/2000 |

(Continued)

OTHER PUBLICATIONS

Office Action dated Nov. 25, 2014 in corresponding Japanese Application No. 2012-234157.

*Primary Examiner* — Jacinta M Crawford
*Assistant Examiner* — Jason Pringle-Parker
(74) *Attorney, Agent, or Firm* — Harness, Dickey & Pierce, P.L.C.

(57) ABSTRACT

A vehicle display apparatus includes a display panel to be placed at a position where a driver visually recognizes the display panel and to display information related to vehicle traveling status. The display panel includes a first display area for displaying a first information and a second display area for displaying second information. The vehicle display apparatus further includes a first display control portion for obtaining the first information, and a second display control portion for obtaining the second information and displaying the second information. A vehicle display apparatus includes the display panel which has a third display area for displaying third information and a fourth display area for displaying fourth information. The vehicle display apparatus further includes a third display control portion and a fourth display control portion.

22 Claims, 16 Drawing Sheets

(56) References Cited

U.S. PATENT DOCUMENTS

2012/0072109 A1* 3/2012 Waite et al. .................. 701/431
2013/0229417 A1* 9/2013 Brenner et al. ............... 345/440

FOREIGN PATENT DOCUMENTS

| | | |
|---|---|---|
| JP | 2004-157434 | 6/2004 |
| JP | 2006-327481 | 12/2006 |
| JP | 2007-090967 | 4/2007 |
| JP | 2007-114035 | 5/2007 |
| JP | 2007-159036 | 6/2007 |
| JP | 2009-179179 | 8/2009 |
| JP | 2010-030575 | 2/2010 |
| JP | 2010-164879 | 7/2010 |

* cited by examiner

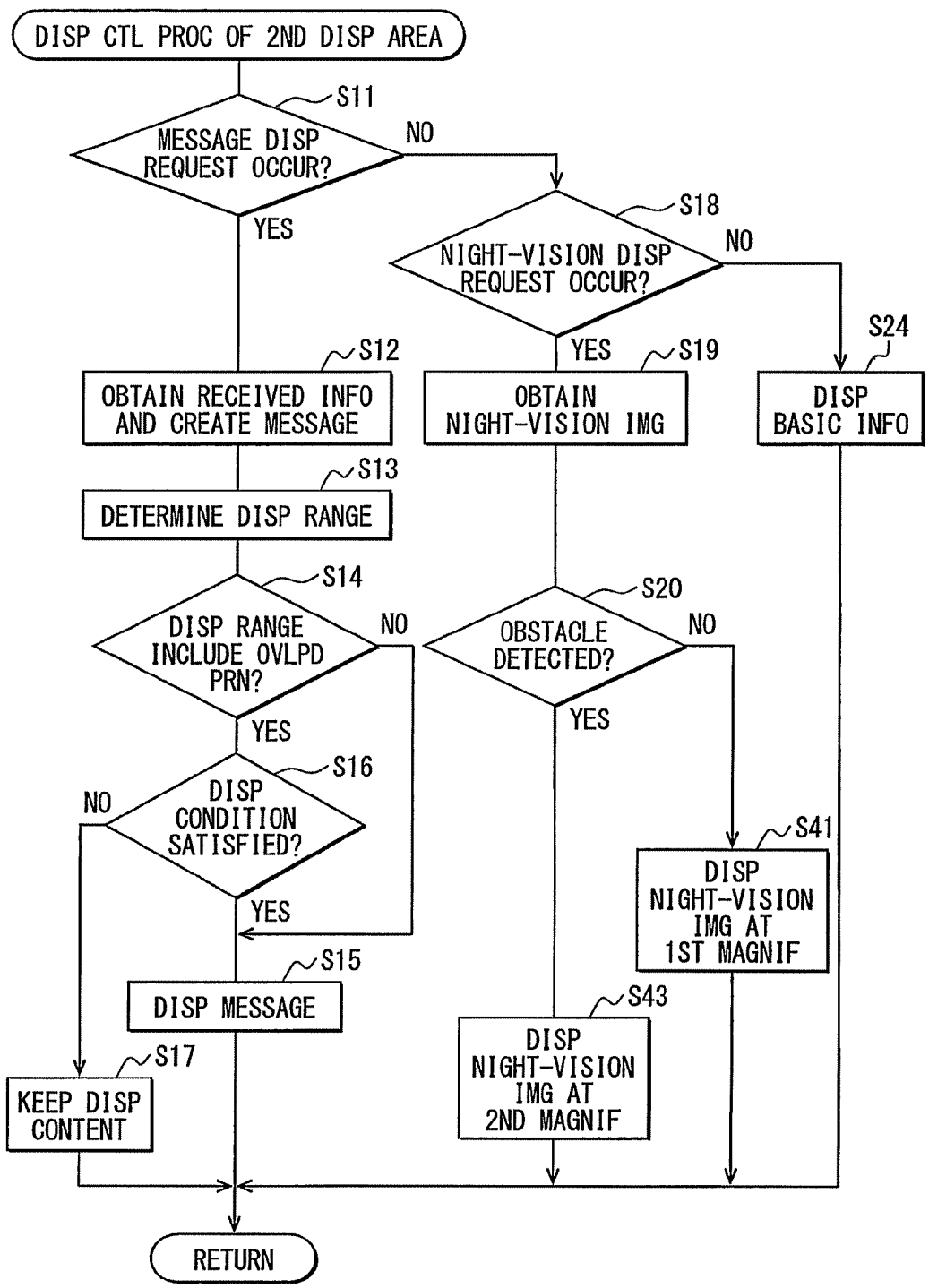

VEHICLE DISPLAY APPARATUS AND VEHICLE DISPLAY CONTROL UNIT

CROSS REFERENCE TO RELATED APPLICATION

This application is based on Japanese Patent Application No. 2012-234157 filed on Oct. 23, 2012 and Japanese Patent Application No. 2012-238782 filed on Oct. 30, 2012, the disclosures of which are incorporated herein by reference.

TECHNICAL FIELD

The present disclosure relates to a vehicle display apparatus and a vehicle display control unit. The vehicle display apparatus is provided with a display panel for displaying an image and displays information or the like on the display panel. The vehicle display control unit is provided for controlling the display panel. The information or the like relates to a vehicle traveling status.

BACKGROUND

Recently, an image display apparatus is proposed as a display apparatus for displaying a vehicle instrument. The image display apparatus is provided with a display panel configured from liquid crystal or the like instead of a mechanical meter. There are advantages that it is possible to arbitrarily make a display design and a display layout.

For example, as the display apparatus which is provided with the display panel to display the image, Japanese Patent No. 4389173 proposes a vehicle display apparatus by which vehicle speed and a night-vision image are displayed on a display panel. The night-vision image is taken by a night-vision camera. In the vehicle display apparatus, in a case where an obstacle exists in front of a vehicle and the obstacle is recognized in the night-vision image, an area for displaying the night-vision image is enlarged. According to this feature, it may be possible that a driver quickly recognize the obstacle.

Furthermore, an image display apparatus is proposed as a display apparatus for displaying a vehicle instrument. The image display apparatus is provided with a display panel configured from liquid crystal or the like instead of a mechanical meter. There are advantages that it is possible to arbitrarily make a display design and a display layout. The image display apparatus can display images, representing a variety of traveling information. For example, traveling information includes vehicle speed, water temperature, traveling distance, engine speed or residual fuel. Multiple information items are selected from the above traveling information; and the selected information items are displayed on the image display apparatus.

A display apparatus, in which an analogue meter image is displayed, is proposed in JP-A-2004-157434, for example. In the display apparatus, a ring image is displayed outside of the analogue meter image, and brightness in a gloss of the ring image is changeable. In this case, a visual effect of the ring image with the gloss effect is improved and a luxury appearance is given by the gloss effect.

SUMMARY

It is an object of the present disclosure to provide a vehicle display apparatus. In the vehicle display apparatus, it is possible to keep visibility of information other than specific information when an image representing the specific information is enlarged on a display panel of the vehicle display apparatus.

The vehicle display apparatus includes a display panel that is placed at a position where a driver visually recognizes the display panel and that displays information related to a vehicle traveling status. The display panel includes a first display area and a second display area. The first display area constantly displays a first information, which is provided by a numerical value. The second display area displays a second information, which is different from the first information. The second information has a display content that changes according to a display request when a vehicle travels. The second display area is arranged to be partially overlapped with the first display area. The vehicle display apparatus further includes a first display control portion and a second display control portion. The first display control portion obtains the first information, controls the first display area to fixedly display the first information at a predetermined position in a predetermined size by a numerical display image indicative of the numerical value, and controls the first display area to subsidiary display a drawing image at a position which is adjacent to the numerical display image and is an outer peripheral portion of the first display area. The second display control portion obtains the second information and displays the second information at the second display area. The second display control portion determines whether a display range of the second display area includes an overlapped portion which overlaps with the first display area. The second display control portion displays the second information within the display range of the second display area. The first display control portion, in a case where the display range of the second display area includes the overlapped portion, shrinks and displays the drawing image in the first display area so that the drawing image does not overlap with the display range of the second display area that includes the overlapped portion.

A vehicle display control unit for a display panel is placed at a position where a driver visually recognizes the display panel, and displays information related to a vehicle traveling status. The vehicle display control unit includes (i) means for setting a first display area on the display panel displaying a first information, which is provided by a numerical value, (ii) means for setting a second display area on the display displaying a second information, which is different from the first information, the second information having a display content that changes according to a display request when a vehicle travels, and the second display area being arranged to be partially overlapped with the first display area, (iii) a first display control portion for obtaining the first information, controlling the first display area to fixedly display the first information at a predetermined position in a predetermined size by a numerical display image indicative of the numerical value, and controlling the first display area to subsidiary display a drawing image at a position which is adjacent to the numerical display image and is an outer peripheral portion of the first display area, and (iv) a second display control portion for obtaining the second information and displaying the second information at the second display area. The second display control portion determines whether a display range of the second display area includes an overlapped portion which overlaps with the first display area. The second display control portion displays the second information within the display range of the second display area. The first display control portion, in a case where the display range of the second display area includes the overlapped portion, shrinks and displays the drawing image in the first display area so that the drawing image in the first display area does not overlap with the display range of the second display area which includes the overlapped portion.

According to the present vehicle display apparatus and the vehicle display control unit, it is possible that the driver correctly recognizes the vehicle speed by the numerical display image, and intuitively recognizes the vehicle speed by the drawing image at a glance. Thus, it is possible to improve the visibility in the display panel. Since the numerical display image is displayed on a predetermined position with a predetermined size, it is possible that the driver finds out the numerical display image immediately when the driver's eyes are moved from a front of the vehicle to the display panel. In a case where the second information is enlarged and displayed, the drawing image, which represents the vehicle speed as the first information, shrinks and is displayed so that the first information does not overlap with the displayed second information. Using the limited display area of the display panel effectively, it is possible to appropriately display the vehicle speed and the second information with considering importance and a required area for the second information or considering a priority to the vehicle speed. The visibility to the driver is assured. In addition, since the drawing image shrinks and is displayed, it is possible for the driver to recognize the vehicle speed intuitively according to the size of the display image.

In addition, it is also an object of the present disclosure to provide a vehicle display apparatus. According to the vehicle display apparatus, the multiple images, which are displayed on a display panel and represent multiple information items, are caused to be easily distinguished and it is possible to improve the visibility of a display image.

The vehicle display apparatus includes a display panel that is placed at a position where a driver visually recognizes the display panel and that displays information related to a vehicle traveling status. The display panel includes a third display area and a fourth display area. The third display area displays third information. The fourth display area displays fourth information which is different from the third information. The third display area and the fourth display area are arranged adjacently. The third information and the fourth information are displayed by a numerical value. The fourth information includes multiple information items whose contents are different from each other. At least one of the multiple information items is displayed within the fourth display area. The third information is represented within a first display range of the third display area. The fourth information is represented within a second display range of the fourth display area. The vehicle display apparatus further includes a third display control portion and a fourth display control portion. The third display control portion obtains the third information, controls the third display area to display a first numerical display image indicative of a numerical value of the third information, and controls the third display area to display a first drawing image whose display mode changes according to the numerical value of the third information. The fourth display control portion obtains the at least one of the plurality of information items displayed within the fourth display area, controls the fourth display area to display the second numerical display image indicative of a numerical value of the fourth information, and controls the fourth display area to display a second drawing image whose display mode changes according to the numerical value of the fourth information. According to a combination of the third information and the fourth information, a differentiation portion differentiates a size of the first display range where the first drawing image is displayed and a size of the second display range where the second drawing image is displayed.

According to the present vehicle display apparatus, it is possible that the driver correctly recognizes the third information and the fourth information through the numerical display images, and intuitively recognizes the third information and the fourth information through the belt-shaped images at a glance. It is possible to improve the visibility of the display panel. In a case where multiple images, representing multiple information items, are displayed on the display panel from side to side, it is possible to differentiate the sizes of the belt-shaped images and it is possible to easily distinguish the images, arranged from side to side. The multiple images, which are displayed on the display panel 31, are caused to be easily distinguished and it is possible to improve the visibility of a display image. It is possible to prevent inconvenience that the sizes of the belt-shaped images change and the visibility reduces.

BRIEF DESCRIPTION OF THE DRAWINGS

The above and other objects, features and advantages of the present disclosure will become more apparent from the following detailed description made with reference to the accompanying drawings. In the drawings:

FIG. 11 is a flow chart illustrating a modified example of the display control in the second display area;

DETAILED DESCRIPTION

Figure 1:
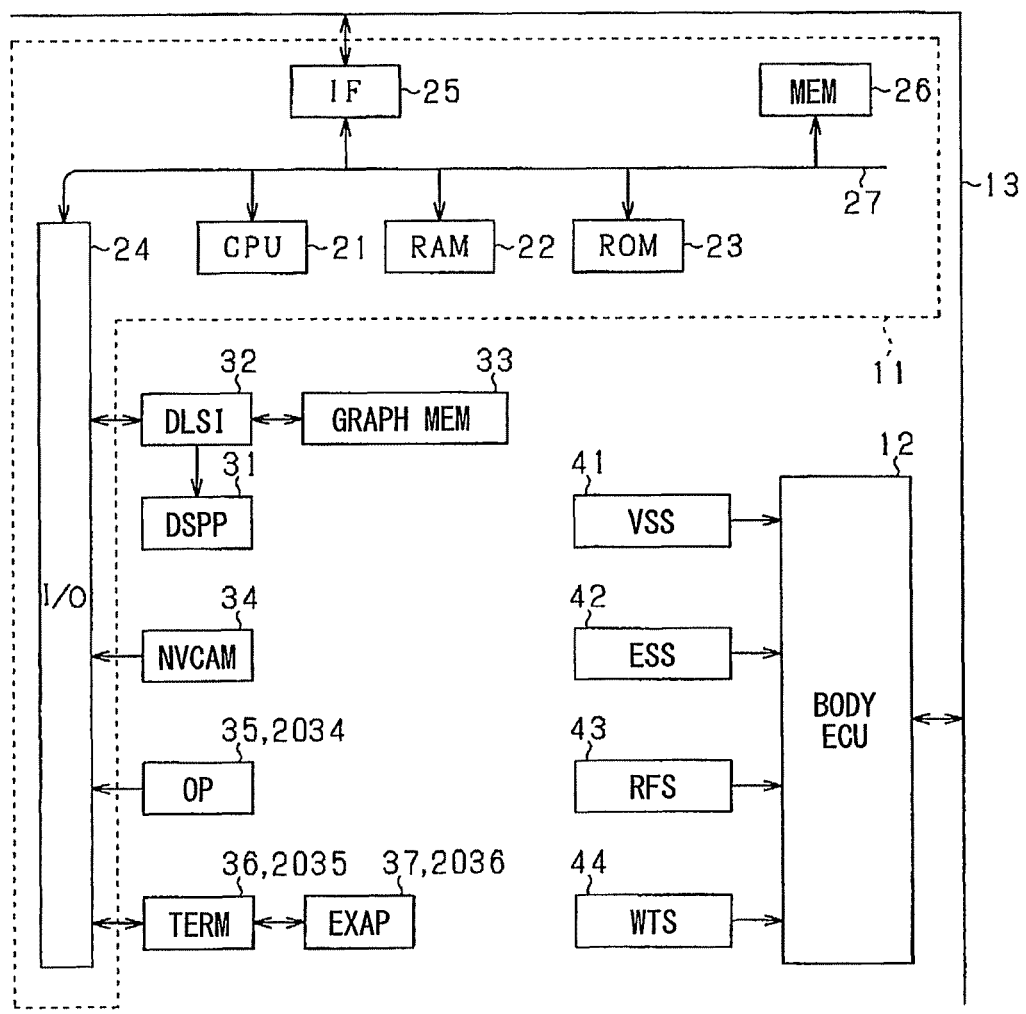
FIG. 1 is a block diagram illustrating an outline of a vehicle display system.

Inventors of the present disclosure have found the following issues with regard to a vehicle display apparatus.

In a case where a night-vision image is enlarged when an obstacle is detected, a display area on a display panel to be used other than the night-vision image may decrease due to enlargement of the night-vision image. Visibility of display information other than the night-vision image may be affected by the enlargement. In the vehicle display apparatus, vehicle speed, for example, should be constantly displayed and not be hidden. In addition, for a reason of safety to travel, a visibility of information about the vehicle speed should be assured. However, in a case where the night-vision image is enlarged, the visibility of the vehicle speed display may decrease. For example, in a case where a display position of the vehicle speed is changed due to enlargement of a display area of the night-vision image, a driver may need to move one's eye in order to look for the display position of the vehicle speed and, as a result, the visibility may decrease. In short, in a case where various information (i.e., images) are displayed on the display panel and either one of the various information is enlarged and displayed, a visibility of information other than the enlarged-display information may not be assured.

In a case where more than two kinds of information are displayed on a limited area of the display panel, for example, when images representing two kinds of information are tried to be arranged with good visibility, it is considered that two images with the same size are arranged from side to side like a twin meter. In this case, at a glance, two similar images are displayed on the display panel. It may be difficult to distinguish the two images each other. Thus, in order to easily distinguish the two images each other and in order to correctly recognize the information represented by each of the two images, improvement is required. Especially, in a case where the display information displayed on at least one of the two display areas in the display panel is replaced (e.g., the display information of the engine speed is replaced to the display information of the fuel efficiency), it may become difficult to distinguish the two images, which are arranged from side to side.

First Example of First Embodiment

A first example of a first embodiment according to the present disclosure will be explained with reference to the drawings. In the present embodiment, the vehicle display apparatus is placed in front of a driver's seat in a vehicle. In other words, the vehicle display apparatus is placed in front of a steering wheel of the vehicle. The vehicle display apparatus displays an image which represents traveling basic information and traveling subsidiary information on the display panel. The traveling basic information denotes, for example, the vehicle speed, an engine speed, or fuel efficiency. The traveling subsidiary information denotes, for example, night-vision image information or navigation information (i.e., route guidance information).

FIG. 1 is a block diagram illustrating an electric configuration of the vehicle display system according to the present disclosure. The display system includes a meter ECU 11 and a body ECU 12, which are in-vehicle ECUs. The meter ECU 11 and the body ECU 12 are communicably connected each other through a serial communication bus 13.

The meter ECU 11 corresponds to a display controller that performs a main control process regarding information display. As described in FIG. 1, the meter ECU 11 includes a CPU 21, an RAM 22, an ROM 23, an input/output (I/O) portion 24, a communication interface 25, and a non-volatile memory 26. The RAM 22 has a working memory. The ROM 23 stores various programs. The non-volatile memory 26 includes a flash memory, for example. The above components are connected through an internal bus 27.

The display system is placed on a position where the display system is visually recognized from a driver's seat (e.g., the position in front of a driver in the present embodiment). The display system includes a display panel 31 which visually displays images of a variety of information. The meter ECU 11 makes a display control for the display panel 31, which is a controlled object. The display panel 31 is an image display panel made from a thin film transistor-color liquid crystal display (a TFT color LCD). Incidentally, the display panel 31 may be another type of display components such as an organic light emitting display or a field emission display.

The meter ECU 11 is connected with a drawing LSI 32, which is a well-known part and corresponds to an image synthesis output controller. The drawing LSI 32 receives a variety of image data, which are to be displayed on the display panel 31, from the meter ECU 11 and synthesizes an image with the graphic memory. 33 so that the drawing LSI 32 outputs data representing a synthesized image to the display panel 31. According to this process, an intended image data is arbitrarily displayed at a specified area on the display panel 31. Incidentally, the vehicle display apparatus corresponds to a configuration including the meter ECU 11, the display panel 31, the drawing LSI 32, and the graphic memory 33.

The meter ECU 11 is connected with a night-vision camera 34 and an operation portion 35. In addition, the meter ECU 11 is connected through a terminal connecter 36 with an external apparatus 37 such as a mobile terminal, including a smartphone. The night-vision camera 34 takes a photograph in front of the vehicle. The operation portion 35 receives an input operation by a user.

The night-vision camera 34 corresponds to a photograph means or a photograph portion, for example, which is mounted to a rearview mirror and takes a photograph in front of the vehicle. The night-vision camera 34 is a well-known camera which can take a photograph at night when light intensity is not enough. In the present embodiment, the night-vision camera 34 includes an infrared camera which detects infrared light radiated from an object in a range of a view. In addition, the night-vision camera 34 may detect natural light or light from other external portions as a light source and furthermore, may utilize light derived from a headlight or a fog lamp of the vehicle. Incidentally, a mounting position of the night-vision camera 34 is not especially limited as long as the night-vision camera 34 can take a photograph in front of the vehicle. In addition, the photograph means may be a night-vision camera with radar or the like. Although an illustration will be omitted, the night-vision camera 34 includes a switch for starting to take a photograph, another switch for adjusting coverage, or the like.

The operation portion 35 includes an instruction switch for instructing the display panel 31 to display a photographed image (corresponding to the night-vision image) that is taken by the night-vision camera 34, another switch for adjusting brightness of the display panel 31, or the like. According to the configuration, the user operates the operation portion 35 so that a display request of the night-vision image occurs and the photographed imaged of the night-vision camera 34 is displayed on a specified position of the display panel 31.

The photographed image of the night-vision camera 34 is displayed on the display panel 31 according to a display condition. The display condition is obtained from not only the operation to the operation portion 35 by the user but also other ways. For example, the display request to be a trigger may be caused by turning on the headlights or the fog lamp of the vehicle so that the photographed image of the night-vision camera 34 may be displayed on the display panel 31. According to brightness outside the vehicle (e.g., brightness detected by a solar radiation sensor), the display request may be provided automatically and the photographed image of the night-vision camera 34 may be displayed on the display panel 31.

The terminal connecter 36 connects the meter ECU 11 and the external apparatus 37 through a universal serial bus (USB) with a wire, for example. The external apparatus 37 is connected or disconnected by the terminal connecter 36. In a case where the external apparatus 37 is connected with the terminal connecter 36, the meter ECU 11 automatically detects the external apparatus 37 and transmits and receives communication information with the external apparatus 37. Incidentally, the meter ECU 11 may wirelessly communicate with the external apparatus 37. In this case, a wireless communication portion with, for example, a Bluetooth (registered trademark) may be provided instead of the terminal connecter 36.

The external apparatus 37 can make a phone call or transmits and receives an e-mail with other terminals or the like. In a condition where the external apparatus 37 is connected with the terminal connecter 36, when the external apparatus 37 receives a phone call or an e-mail, information (corresponding to received information) for indicating reception is sent to the meter ECU 11. When the external apparatus 37 receives the phone call or the e-mail, the meter ECU 11 recognizes the received information, for example, which includes an event of receiving the phone call or the e-mail, information (e.g., a name, a phone number, or an e-mail address) about an information source, or contents of the e-mail.

The body ECU 12 is connected with a sensor group for obtaining basic information which is displayed on the display panel 31. The basic information indicates a condition of the vehicle or an in-vehicle engine. Specifically, the sensor group includes a vehicle speed sensor 41 for detecting vehicle speed, a engine speed sensor 42 for detecting engine speed, a residual fuel sensor 43 for detecting a residual quantity of fuel (e.g., gasoline), or a water temperature sensor 44 for detecting water temperature in an engine.

The meter ECU 11 obtains a variety of information detected from the above sensors 41 to 44 through the body ECU 12 and the serial communication bus 13. The meter ECU 11, according to the detected information obtained from the sensors 41 to 44, provides a drawing data of an image to be displayed on the display panel 31.

The meter ECU 11 has an obstacle detection function which determines whether an obstacle exists in front of the vehicle, according to a photographed image that is taken by the night-vision camera 34. In a condition where the night-vision camera 34 takes a photograph in front of the vehicle, the meter ECU 11 analyses the photographed image and determines whether the obstacle exists with possibility to hit with the vehicle. Herein, the obstacle includes a pedestrian or another vehicle in front of the vehicle, for example.

Figure 2:
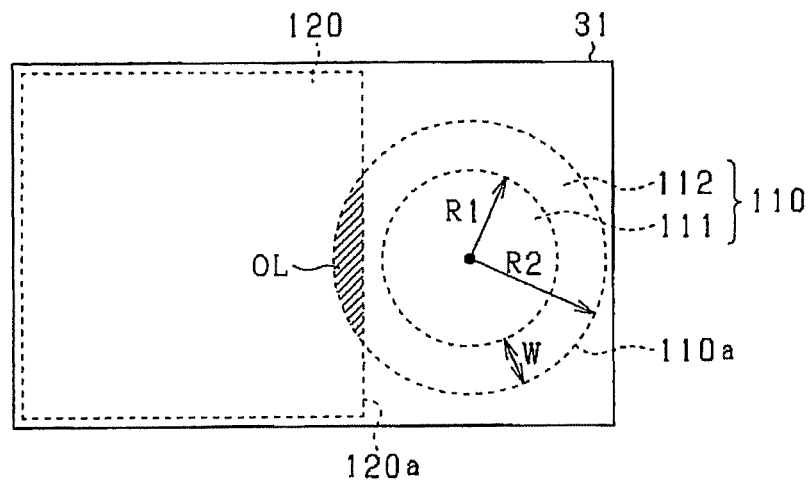
FIG. 2 is a diagram illustrating a partition of a display area in the display panel.

The image display area of the display panel 31 will be explained. In the present embodiment, a variety of information, which is displayed on the display panel 31, is separated into a first information and a second information. The first information can be represented as a numerical value and is continuously displayed on the display panel 31 during vehicle traveling. The second information is information different from the first information and is displayed on the display panel 31 according to the display request generated during vehicle traveling. Images of the first information and the second information are displayed on different areas on the display panel 31. Partition of the image display area on the display panel 31 will be explained with reference to FIG. 2. FIG. 2 is a front view of the image display area of the display panel 31.

In FIG. 2, the display panel 31 includes a first display area 110 and a second display area 120. The first display area 110 displays the first information and the second display area 120 displays the second information. The first display area 110 and the second display area 120 are placed from side to side, and the first display area 110 and the second display area 120 overlap partially. The first display area 110 is a circular area which has a circular shape. The end of the first display area 110 corresponds to an outer periphery edge 110a and the first information is displayed on an inner area of the outer periphery edge 110a. The second display area 120 is a rectangular area which has a rectangular shape. The end of the second display area 120 corresponds to an outer periphery edge 120a and the second information is displayed on an inner area of the outer periphery edge 120a.

The first display area 110 has an inner area 111, which has a circular shape, and an outer area 112, which is arranged around the inner area 111 and has a ring shape. The inner area 111 and the outer area 112 have the same center point. A radius of the inner area 111 corresponds to R1. The radius of the outer area 112 corresponds to R2. The outer area 112 has a constant width, represented by W.

In the present embodiment, it is supposed that the first information is the vehicle speed. The vehicle speed is displayed on each of the inner area 111 and the outer area 112 in the first display area 110. Although images representing the vehicle speed, based on the same vehicle information, are displayed on the inner area 111 and the outer area 112, display modes are different between the inner area 111 and the outer area 112. In the inner area 111, the vehicle speed is displayed as a numerical display image (e.g., an image representing an Arabic number). In the outer area 112, the vehicle speed is displayed as a belt-shaped image whose length is changed according to the vehicle speed. In this case, the length of the belt-shaped image in the outer area 112 changes in conjunction with the numerical display image in the inner area 111.

Figure 3A:
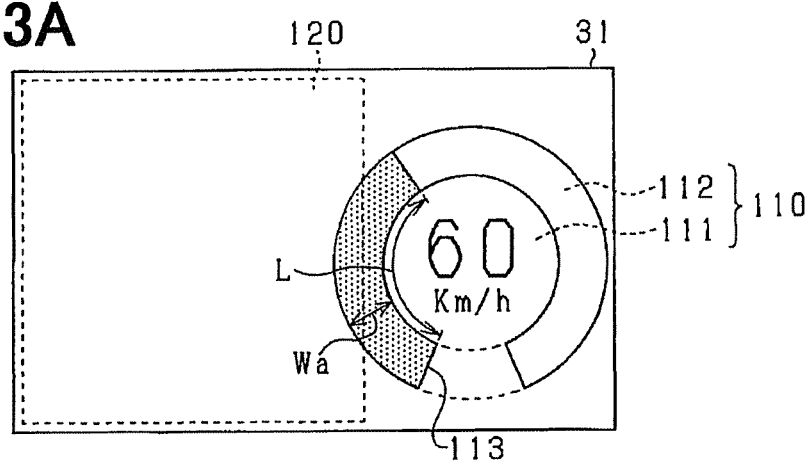
FIG. 3A is a diagram illustrating a first display area in the display panel, in a case where the width of the belt-shaped image is Wa.

Specifically, as described in FIG. 3A, the vehicle speed information is displayed in the inner area 111 as the numerical display image such as 60 km/h. The vehicle speed information is displayed in the outer area 112 as the belt-shaped image with the length L, which is measured from a base portion 113. The length L of the belt-shaped image corresponds to 60 km/h, for example. The length of the belt-shaped image is variable. The belt-shaped image is an arc image with an arc-like shape. As the vehicle speed increases, the length L of the belt-shaped image elongates.

In the present embodiment, a size and a position of the inner area 111 are constant. The inner area 111 consistently displays the numerical display image for representing the vehicle speed in a constant manner. According to this feature, in a case when a driver reads the vehicle speed from the numerical display image, it is enough for the driver to look at the same position consistently and it is possible that the driver reads the vehicle speed easily.

Figure 3B:
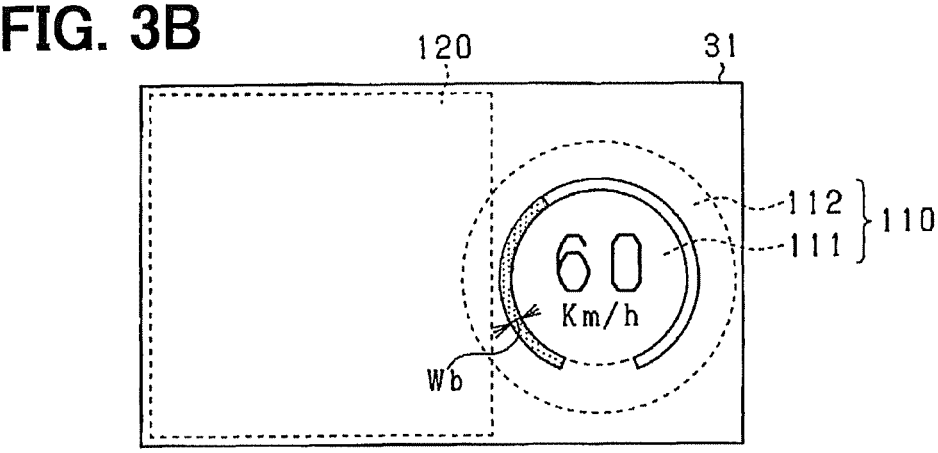
FIG. 3B is a diagram illustrating a first display area in the display panel, in a case where the width of the belt-shaped image is Wb.

It is possible to recognize the vehicle speed intuitively by looking at the belt-shaped image, which is displayed in the outer area 112, without reading the numerical values. In addition, in the outer area 112, a width of the belt-shaped image is variable. The maximum value of the width of the belt-shaped image corresponds to the width W of the outer area. It is possible that, when the vehicle speed is same, the width of the belt-shaped image is changeable. For example, in FIG. 3A, the width of the belt-shaped image is represented by Wa, and in FIG. 3B, the width of the belt-shaped image shrinks to be represented by Wb. The outer area 112 has an inner peripheral side and the outer peripheral side. In a case where the width of the belt-shaped image shrinks, the width of the belt-shaped image becomes narrower from the outer peripheral side of the outer area 112. According to this feature, when the width of the belt-shaped image shrinks, an image in a portion where the belt-shaped image contacts with the inner area 111 does not change. The portion corresponds to a boundary portion defined by the inner peripheral side of the outer area 112 and an outer side of the inner area 111. Thus, it is possible to keep a relationship between the inner area 111 and the outer area 112.

Alternatively, in a case where the width of the belt-shaped image shrinks, the width of the belt-shaped image may become narrower from the outer peripheral side more than from the inner peripheral side of the outer area 112.

Since the inner area 111 displays the vehicle speed at a fixed position, the inner area 111 corresponds to a fixed display area. Since the outer area 112 subsidiary displays the vehicle speed in addition to the numerical display image, the outer area 112 corresponds to a subsidiary display area.

As described in FIG. 2, the second display area 120 is provided to overlap with only the outer area 112 of the first display area 110. A hatched area indicates an overlapped portion OL. The second information is displayed on the second display area 120. The second information, in addition to the basic information such as the engine speed, fuel efficiency (i.e., instantaneous fuel consumption), a residual fuel or a water temperature, includes a night-vision image, which is photographed by the night-vision camera 34, and the received information, which is received from the external apparatus 37. At least one of the above information items is selected and the selected information item is displayed on the second display area 120. Thus, content, which is displayed on the second display area 120, may be changeable according to the display request which occurs during vehicle traveling.

In the second display area 120, a display range used in an image display changes according to the information that is displayed as the second information. For example, in a case where the engine speed is displayed, as described in FIG. 4A, in the second display area 120, the engine speed is displayed in a display range which does not include the overlapped portion OL. Incidentally, in FIG. 4A, the engine speed is displayed with a numerical display image and a belt-shaped image in two display areas provided by an inner area and an outer area, similar to the vehicle speed in the first display area 110. It is unnecessary to be the same manner to the vehicle speed. The engine speed may be displayed only by the numerical display image. Other information, such as the fuel efficiency, the residual fuel or the water temperature other than the engine speed, which can be displayed by a numeral, may be displayed according to each display request.

Figure 4A:
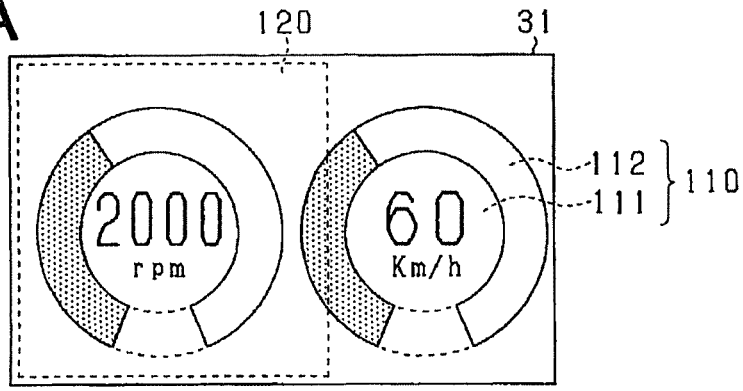
FIG. 4A is a diagram illustrating a second display area in the display panel, in a case where engine speed is displayed in the second display area.

In the present embodiment, as a default image of the display panel 31 after turning on a power switch of the vehicle, the first display area 110 displays the vehicle speed and the second display area 120 displays the engine speed, as described in FIG. 4A. Incidentally, as the default image, it is enough to display the travel basic information as the second information, and the travel basic information such as the fuel efficiency (i.e., the instantaneous fuel consumption), the residual fuel or the water temperature may be displayed instead of the engine speed.

After turning on the power switch of the vehicle, an opening image (including an animation image) may be displayed before the default image as described in FIG. 4A is displayed on the display panel 31. The opening image denotes an image or an animation image which is especially displayed when the power switch of the vehicle turns on. In addition, in a case where the vehicle stops (i.e., in a non-traveling state) after turning on the power switch, it is possible to display information different from the above described travel basic information or to turn off (i.e., stop displaying) the display panel 31 for power saving.

Figure 4B:
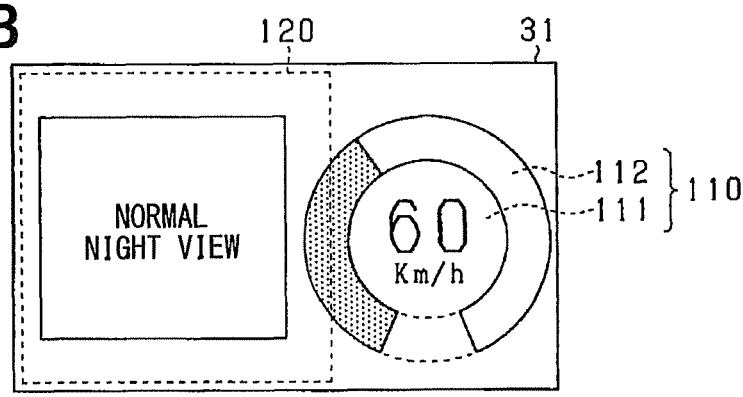
FIG. 4B is a diagram illustrating a second display area in the display panel, in a case where a night-vision image is displayed in a normal size.
Figure 4C:
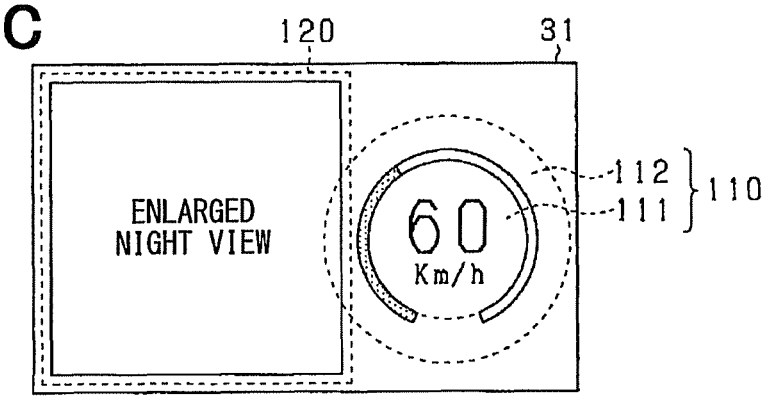
FIG. 4C is a diagram illustrating a second display area in the display panel, in a case where the night-vision image is displayed in an enlarged size.

In a case where the night-vision image is displayed, as described in FIG. 4B and FIG. 4C, the second display area 120 displays the night-vision image. In the FIG. 4B, the night-vision image is displayed within a display range that does not includes the overlapped portion OL in the second display area 120. In this case, the night-vision image in FIG. 4B denotes a normal night-view image. In FIG. 4C, the night-vision image is displayed within a display range that includes the overlapped portion OL in the second display area 120. In this case, the night-vision image in FIG. 4C denotes an enlarged night-view image. In a case where the enlarged night-view image is displayed, the width of the belt-shaped image of the vehicle shrinks so that the enlarged night-view image does not overlap with the belt-shaped image, indicating the vehicle speed, in the first display area 110 (referring to FIG. 3B).

In a case where the display request of the night-vision image occurs with an operation of the operation portion 35, the normal night-view image is displayed basically, as described in FIG. 4B. In a case where the display request of the night-vision image occurs and the meter ECU 11 detects the obstacle in front of the vehicle, the night-vision image in the second display area 120 is enlarged to display the enlarged night-view image as described in FIG. 4C.

Figure 4D:
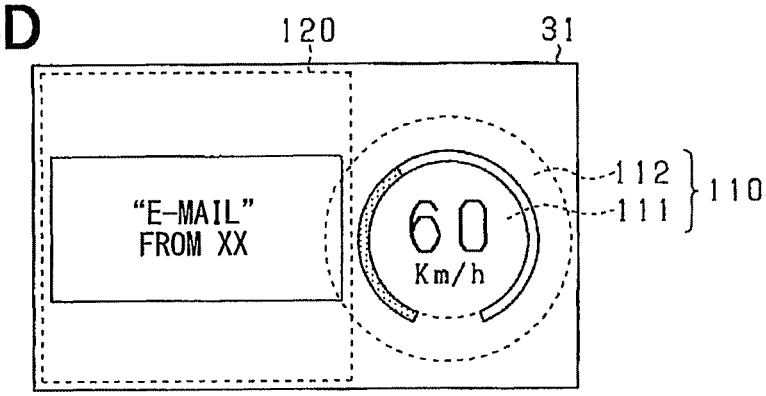
FIG. 4D is a diagram illustrating a second display area in the display panel, in a case where a message about received information of an external apparatus is displayed.

In a case where the message about received information of the external apparatus 37 is displayed, as described in FIG. 4D, a message image is displayed on the second display area 120. Herein, a size of the message image, i.e., a display range of the message image in the second display area 120, is variably set according to the amount of information volume each time. In one case, the message image may be displayed within the display range that does not include the overlapped portion OL in the second display area 120. In another case, as described in FIG. 4D, the message image may be displayed within the display range that includes the overlapped portion OL in the second display area 120. In a case where the message image is displayed within the display range that includes the overlapped portion OL, the width of the belt-shaped image of the vehicle shrinks.

It may be possible that the second information includes information about a failure of the vehicle or the engine, or information about vehicle traveling safety, and that a message about the above second information is displayed on the display panel 31. In this case, when the vehicle or the engine has a difficulty, the meter ECU 11 may cause the second display area 120 of the display panel 31 to display the message about the difficulty. According to this, with keeping the visibility of the first information, the driver may be informed that the vehicle should be traveled for evacuation. The meter ECU 11 may determine tiredness of the driver based on the vehicle traveling distance or traveling time and may display a message about the tiredness on the second display area 120 of the display panel 31.

Figure 5:
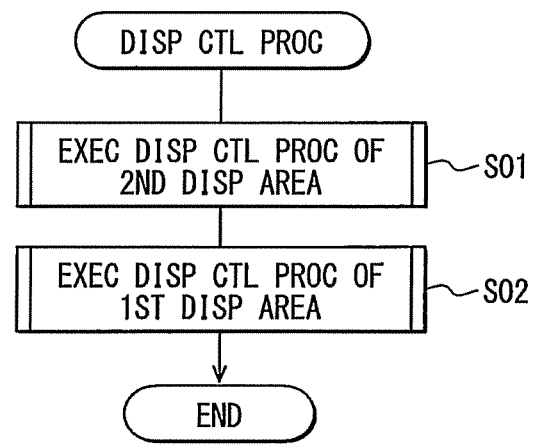
FIG. 5 is a flow chart illustrating a main routine of a display control process.

A display control process performed by the meter ECU 11 will be explained. FIG. 5 is a flow chart illustrating a main routine of the display control process. The display control process is repeatedly performed by the meter ECU 11 at a predetermined time period.

In FIG. 5, at step S01, the meter ECU 11 performs a display control about the second display area 120. At step S02, the meter ECU 11 performs a display control about the first display area 110. The display control of the second display area 120 will be explained with a subroutine in FIG. 6. The display control of the first display area 110 will be explained with a subroutine in FIG. 7.

Figure 6:
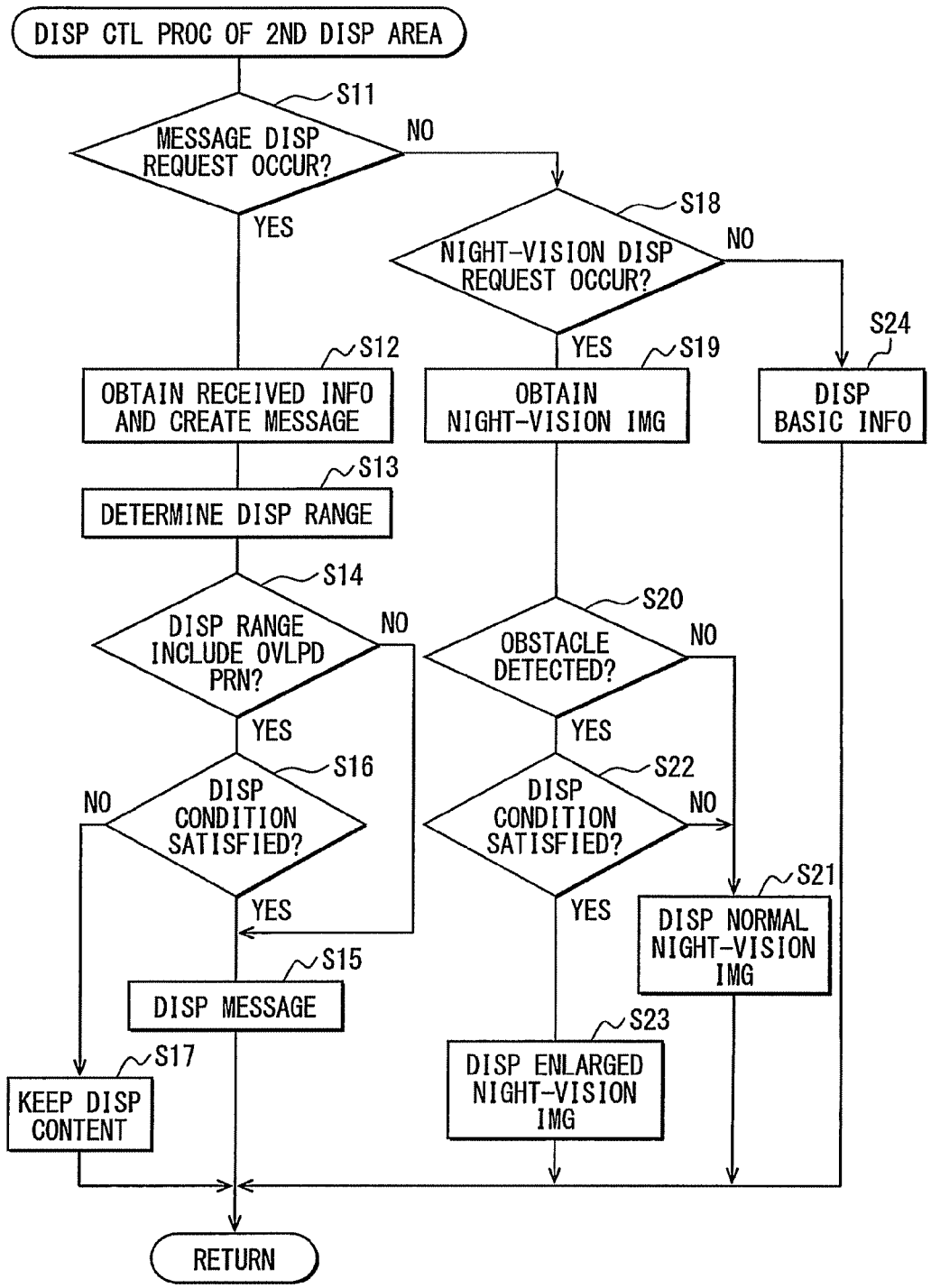
FIG. 6 is a flow chart illustrating a display control of the second display area.

In FIG. 6, at step S11, the meter ECU 11 determines whether a message display request occurs for requesting the display panel 31 to display the message image. In a case where the message display request occurs, the process proceeds to step S12. At step S12, the received information from the external apparatus 37 is obtained and, based on the received information, the meter ECU 11 creates a message for displaying the display panel 31. When the message is created, at least one of the following messages is created: (1) a message indicating a receiving of a phone call or an e-mail, (2) a message indicating a source of the phone call or the e-mail, or (3) a message corresponding to a title or contents of the e-mail (when the e-mail is received). Incidentally, a user may perform a setting operation to determine which of the message is created in the above messages (1) to (3), for example.

At step S13, the meter ECU 11 determines the display range in the second display area 120 with respect to the above created message. Based on the amount of the information volume (e.g., the number of the characters) of the message, the meter ECU 11 determines whether the display range of the message includes the overlapped portion OL or not.

At step S14, the meter ECU 11 determines whether the display range of the message on this occasion includes the overlapped portion OL. In a case where the display range of the message does not include the overlapped portion OL, the process proceeds to step S15. At step S15, the message created at step S12 is displayed on the display range determined at step S13.

At step S14, in a case where the display range includes the overlapped portion OL, the process proceeds to step S16. At step S16, the meter ECU 11 determines a display condition that the message may be displayed with the overlapped portion OL. The display condition is determined based on a vehicle traveling state. Specifically, the display condition includes a condition where the vehicle is not in a high-speed traveling, or where a traveling path of the vehicle is not a winding road (i.e., the path does not have many corners), for example. Incidentally, it may be determined that the vehicle is not in the high-speed traveling when the vehicle speed is equal to or less than a predetermined value (e.g., 80 km/h). It may be determined whether the traveling path of the vehicle is a winding road, based on map information of a navigation apparatus or frequency of a steering wheel operation by the driver, for example. In this case, the vehicle speed sensor 41 or the navigation apparatus may correspond to a vehicle traveling state detection means or a vehicle traveling state detection portion. The navigation apparatus may be provided by the external apparatus 37.

In a case where the display condition is satisfied, the process proceeds to step S15. The meter ECU 11 displays the message created at the above step S12 on the display range determined at step S13 (including the overlapped portion OL). In a case where the display condition is not satisfied, the process proceeds to step S17. At step S17, the meter ECU 11 does not display the message, which is created based on the received information on this occasion, and the meter ECU 11 keeps content in a previous time in the second display area 120. The process returns to the main routine.

In summary, when the message is displayed within the display range which includes the overlapped portion OL, the display area (actually, the outer area 112) for the vehicle speed in the first display area 110 is reduced by the overlapped portion OL. Accordingly, depending on the traveling state, the visibility for the vehicle speed has the highest priority and the message is not displayed even when the massage display request occurs.

At step S17, the message information (i.e., the message information provided in the display range which includes the overlapped portion OL) is temporarily stored, and the process returns to the main routine. When the display control process of the second display area 120 is performed again and the display condition is satisfied at step S16, the message is displayed on the second display area 120.

In a case where the message display request does not occur ("NO" at step S11), the process proceeds to step S18. The meter ECU 11 determines whether a night-vision image display request occurs. Herein, the night-vision image request corresponds to a request to display the night-vision image on the display panel 31. In a case where the night-vision image display request occurs, the process proceeds to step S19 and the meter ECU 11 obtains the night-vision image from the night-vision camera 34.

At step S20, the meter ECU 11 determines whether an obstacle exists in front of the vehicle. In a case where the obstacle is detected, the process proceeds to step S21. At step S21, the meter ECU 11 displays the night-vision image in a normal size (i.e., a size in which the overlapped portion OL is not included) on the second display area 120, as described in FIG. 4B.

In a case where the obstacle is detected at step S20, the process proceeds to step S22. A display condition is determined whether the display range of the night-vision image may be enlarged to include the overlapped portion OL or not. Incidentally, the display condition is similar to the display condition described in step S16. The contents of the display condition may be different between step S22 and step S16.

In a case where the display condition is satisfied, the process proceeds to step S23. At step S23, the meter ECU 11 enlarges the display range of the night-vision image so that the display range includes the overlapped portion OL in the second display area 120. The meter ECU 11 displays the night-vision image on the second display area 120, as described in FIG. 4C. After step S23, the process returns to the main routine. In a case where the display condition is not satisfied at step S22, the process proceeds to step S21. The meter ECU 11 displays the night-vision image in the normal size without enlargement of the display range of the night-vision image, and the process returns to the main routine.

In a case where neither the message display request nor the night-vision display request occurs ("NO" at step S11 or S18), the process proceeds to step S24. At step S24, the travel basic information, such as the engine speed (referring to FIG. 4A), is displayed on the second display area 120, and the process returns to the main routine.

Figure 7:
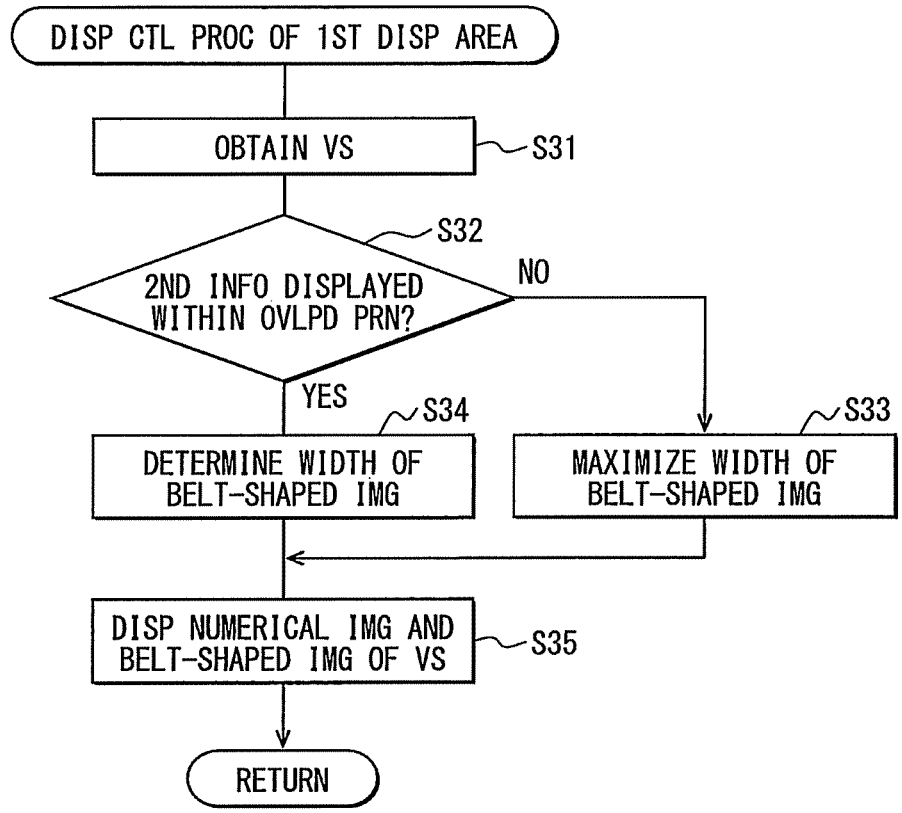
FIG. 7 is a flow chart illustrating a display control of the first display area.

A display control of the first display area 110 will be explained with referring to FIG. 7. At step S31, the meter ECU 11 obtains the vehicle speed. At step S32, the meter ECU 11 determines whether the information (i.e., the second information) which is displayed on the second display area 120 is displayed on the display range which includes the overlapped portion OL. In a case where the display range does not include the overlapped portion OL, the process proceeds to step S33. At step S33, the width of the belt-shaped image, which is displayed on the outer area 112 in the first display area 110, is set to the same width of the outer area 112 i.e., the width of the belt-shaped image is set to a maximum value (corresponding to "W").

In a case where the second information is displayed on the display range which includes the overlapped portion OL, the process proceeds to step S34. The meter ECU 11 determines the width of the belt-shaped image to be displayed on the outer area 112 in the first display area 110 according to the display range of the message or the night-vision image in the second display area 120. The meter ECU 11 determines an extent of shrinkage of the belt-shaped image.

At step S35, the meter ECU 11 displays the numerical display image of the vehicle speed on the inner area 111 in the first display area 110, and displays the belt-shaped image on the outer area 112 in the first display area 110, and then the process returns to the main routine. According to this, in the first display area 110, the vehicle speed is displayed on a predetermined position with a predetermined size at a fixed position. In addition, the vehicle speed is subsidiary displayed by the belt-shaped image on a position adjacent to the numerical display image.

Technical advantages according to the present embodiment will be described below.

(1) In the vehicle display system of the present embodiment, the vehicle speed as the first information is continuously displayed on the first display area 110 during vehicle traveling. Especially, the vehicle speed is displayed as the numerical display image on the inner area 111, and is displayed as a drawing image on the outer area 112. According to this feature, it is possible that the driver correctly recognizes the vehicle speed by the numerical display image, and intuitively recognizes the vehicle speed by the drawing image at a glance. Thus, it is possible to improve the visibility in the display panel 31. Furthermore, since the numerical display image is displayed on a predetermined position with a predetermined size, it is possible that the driver finds out the numerical display image immediately when the driver's eyes are moved from a front of the vehicle to the display panel 31.

A display content of the second information changes according to the display request occurred during vehicle traveling. The second information is displayed on the second display area 120. Furthermore, by using the overlapped portion OL which overlaps with the first display area 110, it is possible to enlarge and display the second information. In a case where the second information is enlarged and displayed, the drawing image, which represents the vehicle speed as the first information, shrinks and is displayed so that the first information does not overlap with the displayed second information.

In this case, regarding to the first information, only the drawing image, which is subsidiary displayed shrinks. The numerical display image, which is displayed in a fixed manner, does not change. Thus, with using the limited display area of the display panel 31 effectively, it is possible to appropriately display the vehicle speed and the second information with considering importance and a required area for the second information or considering a priority to the vehicle speed. In this case, since a display mode of the numerical display image for representing the vehicle speed does not change, the visibility to the driver is assured. In addition, since the drawing image shrinks and is displayed, it is possible for the driver to recognize the vehicle speed intuitively according to the size of the display image (i.e., a length of the belt-shaped image). Thus, it is possible that, in a case where the image of the second information is enlarged and displayed, the visibility of the image for representing the vehicle speed is assured and maximized.

(2) The drawing image that is provided at a position adjacent to the numerical display image corresponds to the belt-shaped image, and is arranged around the numerical display image. Thus, in each case where the drawing image is reduced or is not reduced, it may be possible to keep a sense of unity of the numerical display image and the drawing image. Especially, by using the arc-shaped image as the belt-shaped image, a display state where the arc-shaped image substantially surrounds the numerical display image. According to the display state, a sense of unity between the numerical display image and the drawing image may be improved. Furthermore, by displaying the numerical display image at a center part of the arc-shaped image, it is possible to indicate that identical information is displayed among the numerical display image and the drawing image.

(3) In a case where, based on the traveling state of the vehicle, the message image is displayed on a display range which includes the overlapped portion OL and when the display condition is not satisfied, the message is not displayed. By not displaying the message on the overlapped portion OL when the display condition is not satisfied, it has a priority to assure the visibility of the vehicle speed so that it is possible to assure the visibility of the vehicle speed.

In a case where the display area of the message includes the overlapped portion OL and the display condition is not satisfied, information of the message is temporarily stored. When the display condition is satisfied in a next determination, the message is displayed. Thus, when a condition that the message is displayed with including the overlapped portion OL is satisfied, the message is displayed immediately.

(4) Since the night-vision image is used in order to find the obstacle in front of the vehicle, the night-vision image may display a broader area than a conventional night-vision image. In a case where the night-vision image as the second information is displayed on the second display area 120, the night-vision image is displayed with including the overlapped portion OL. Based on a size of the night-vision image, a size of the drawing image is reduced. Thus, it may be easy to find the obstacle displayed on the night-vision image and it is possible to assure the visibility of the vehicle speed which is the first information.

(5) In a case where the obstacle is recognized in front of the vehicle when the night-vision image is displayed, the night-vision image, reflecting an image in front of the vehicle, enlarges and the drawing image reduces. Since both of sizes of the night-vision image and the drawing image are changed, it is possible to attract an attention of the driver to the display panel 31. In addition, by enlarging the night-vision image, it is possible to improve the visibility of the obstacle in the night-vision image. Although the drawing image shrinks, the drawing image is kept to be displayed so that it is possible to assure the visibility of a drawing image that represents the vehicle speed.

Other Example of First Embodiment

Figure 8A:
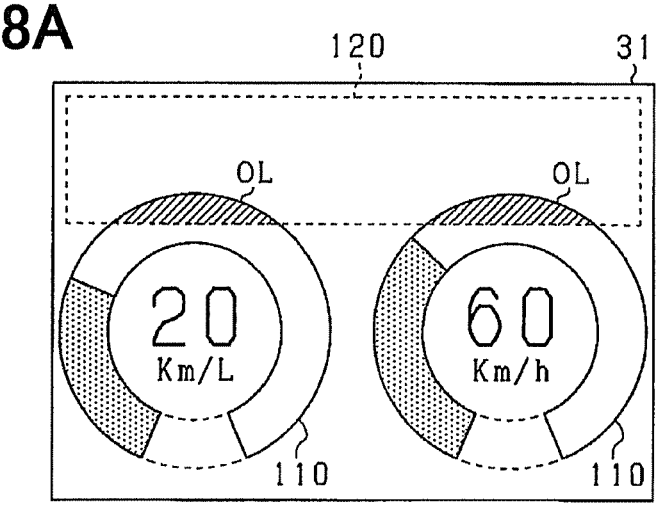
FIG. 8A is a modified example of each of the display area in the display panel.

The display panel 31 may include the multiple first display areas 110. Specifically, as described in FIG. 8A, the display panel 31 may have the two first display areas 110 from side to side and each of the two first display areas 110 may display the first information. Each of the two first display areas 110 includes, similar to FIG. 2, the inner area 111 and the outer area 112. Herein, it is supposed that the first information is information of the vehicle speed or the fuel efficiency. The vehicle speed is displayed on the right first display area 110, and the fuel efficiency is displayed on the left first display area 110. In addition, in the display panel 31, the second display area 120 is arranged on the upper side of the two first display areas 110. The second display area 120 overlaps with the outer area 112 of each of the two first display areas 110. A shaded part in FIG. 8A corresponds to the overlapped portion OL. In the embodiment, the second, display area 120 displays the message based on the received information of the external apparatus 37.

The display control by the meter ECU 11 will be explained briefly. In a case where the display request of the message does not occur, as described in FIG. 8A, the second display area 120 does not display the message. In this case, each of the first display area 110 displays the vehicle speed or the fuel efficiency. The vehicle speed is displayed at a fixed position in the inner area 111 and subsidiary displayed by the belt-shaped image with a maximized width of the outer area 112. The fuel efficiency is displayed at a fixed position in the inner area 111 and subsidiary displayed by the belt-shaped image with a maximized width of the outer area 112.

Figure 8B:
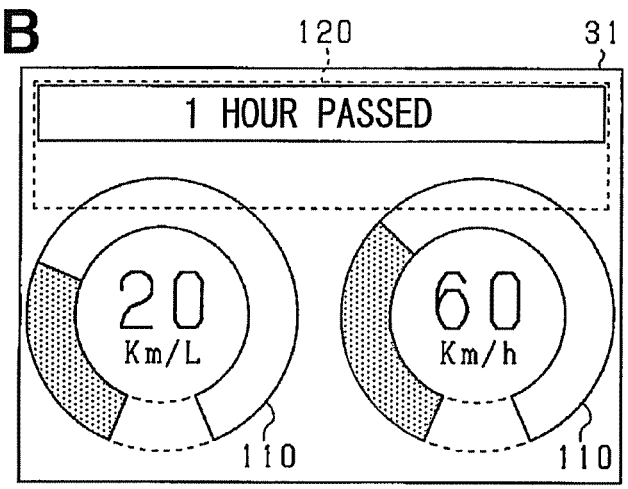
FIG. 8B is a modified example of each of the display area in the display panel and illustrates a first example when a display request of a message occurs and the second display area displays the message.
Figure 8C:
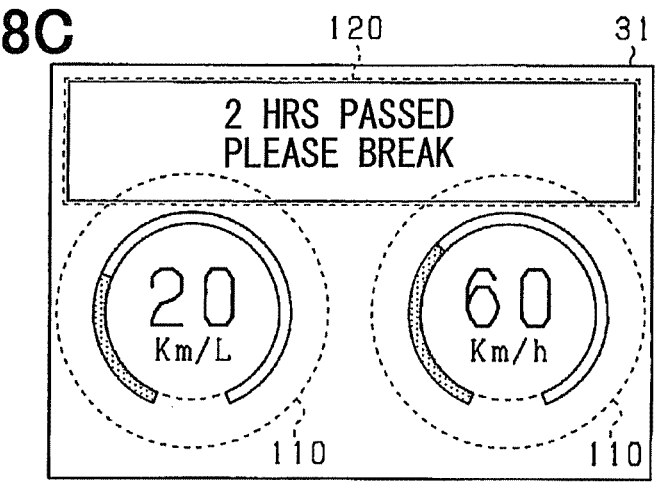
FIG. 8C is a modified example of each of the display area in the display panel and illustrates a second example when the display request of another message occurs and the second display area displays the message.

FIG. 8B and FIG. 8C illustrate cases where the display request of the message occurs and the second display area 120 displays the message. In this case, the amount of information volume (i.e., the number of characters) is different between FIG. 8B and FIG. 8C. In FIG. 8B, the message image is displayed in the display range which does not include the overlapped portion OL. In FIG. 8C, the message image is displayed within the display range which includes the overlapped portion OL. In FIG. 8C, the display portion (corresponding to the subsidiary display portion), indicating the vehicle speed or the fuel efficiency, in the outer area 112 shrinks.

Figure 9:
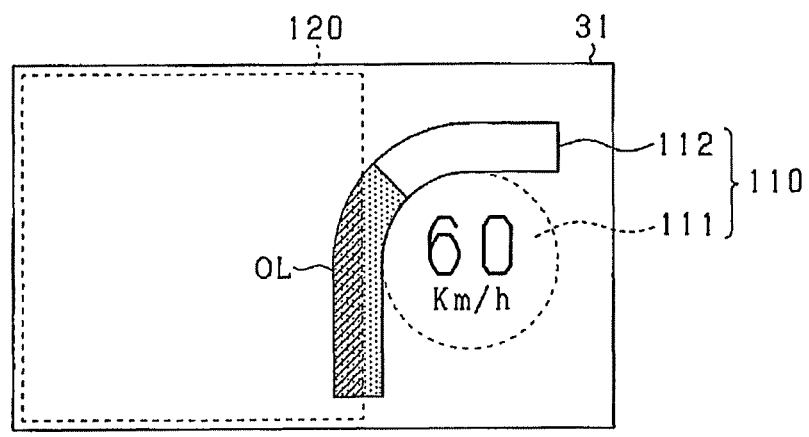
FIG. 9 is another modified example of each of the display area in the display panel.

The outer area 112 of the first display area 110 may be a shape other than a ring shape. For example, as described in FIG. 9, the outer area 112 may be a substantially L-shaped area and the belt-shaped image may be displayed on the outer area 112. In a case where the outer area 112 overlaps with the second display area 120 and the second information is displayed within the display range which includes the overlapped portion OL, the width of the belt-shaped image reduces. Incidentally, a shape of the outer area 112 is arbitrary as long as the outer area 112 is arranged adjacent to the inner area 111 and is displayed on a position which is a peripheral part of the first display area 110. The drawing image displayed on the outer area 112 may cause a sense of visual unity with the numerical display image displayed on the inner area 111.

Figure 10:
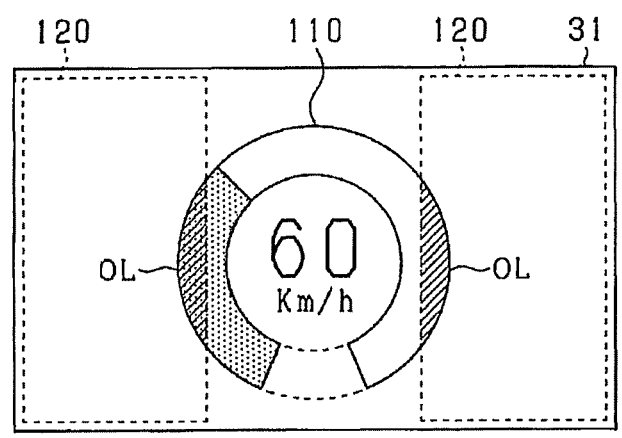
FIG. 10 is another modified example of each of the display area in the display panel.

The display panel 31 may include the multiple second display area 120. Specifically, as described in FIG. 10, in the display panel 31, the two second display areas 120 are arranged and the first display area 110 is arranged between the two second display areas 120. Each of the two second display areas 120 displays each of the second information. For example, the left second display area 120 displays the basic information such as the engine speed, or the like. The right second display area 120 displays the night-vision image. In a configuration in FIG. 10, the two overlapped portions OL are arranged. In the present configuration, in a case where the second information is displayed on an area which includes each of the two overlapped portion OL in the two second display areas 120, the drawing image in the outer area 112 reduced.

The display panel 31 may include the multiple first display areas 110 and sizes of some of the multiple first display areas 110 may reduce and sizes of the other of the multiple first display areas 110 may enlarge or may not change. For example, in a case where the second information is displayed within an area including the overlapped portion OL, some of the multiple first display areas 110 may reduce. Some of the multiple first display areas 110 may enlarge and the other of the multiple first display areas 110 may reduce, based on the traveling state. For example, in a case where the display panel 31 includes the two first display areas 110, it is supposed that one of the two first display areas 110 displays the vehicle speed as the first information and the other of the two first display areas 110 displays a distance to empty as the first information. In this case, when importance of the distance to empty increases due to shortening of the distance to empty, the outer area 112 of the first display area 110 indicating the distance to empty may enlarge and the outer area 112 of the first display area 110 indicating the vehicle speed may reduce.

According to information which is displayed, it may be determined whether the second information is displayed within the display range which includes the overlapped portion OL. Thus, in a case where the second display area 120 displays the traveling basic information such as the engine speed or the fuel efficiency, the second information may be displayed within the display range which does not include the overlapped portion OL. In a case where the second display area 120 displays the night-vision image or the message image, the second information may be displayed within the display range which includes the overlapped portion OL. Specifically, as described in FIG. 11, instead of step S21 and step S23 in FIG. 6, step S41 and step S43 are performed, respectively. In addition, step S22 in FIG. 6 is skipped.

In a case where the night-vision image request is proposed ("YES" at step S18) and the obstacle is not recognized ("NO" at step S20), the process proceeds to step S41. At step S41, the display range of the night-vision image is enlarged at a first magnification to include the overlapped portion OL in the second display area 120 so that the enlarged night-vision image is displayed. In a case where the night-vision image request is proposed ("YES" at step S18) and the obstacle, is recognized ("YES" at step S20), the process proceeds to step S43. At step S43, the display range of the night-vision image is enlarged at a second magnification to include the overlapped portion OL in the second display area 120 so that the enlarged night-vision image is displayed. Herein, the second magnification is greater than the first magnification. The enlarged night-view image displayed at step S43 is larger than the enlarged night-view image. Thus, an area of the overlapped portion OL at step S43 is larger than the area of the overlapped portion OL at step S41, and the display area of the vehicle speed in the first display area 110 is reduced.

According to this configuration, in a case where the second display area 120 displays the traveling basic information such as the engine speed or the fuel efficiency, the width of the drawing image displayed on the outer area 112 in the first display area 110 does not reduce so that it is possible to improve the visibility of the vehicle speed. In addition, in a case where the second display area 120 displays information, such as the night-vision image or the message image, requiring a display area, the second information is displayed on the display area including the overlapped portion OL so that it is possible to improve the visibility of the second information.

The second information, which is displayed on the second display area 120, may be navigation information produced by a navigation system. The navigation system produces the navigation information based on map data, the present position of the subject vehicle, or the like. The meter ECU 11 obtains the navigation information from the navigation system, and displays the obtained information on the display panel 31. In this case, based on a display request which is accompanied by an operation in the operation portion 35 (or another operation switch provided as the navigation system), the second display area 120 displays a map image. The second display area 120 displays the map image within the display area which does not include the overlapped portion OL, normally. When the vehicle arrives at a specified position, for example, a periphery of a destination or a position to travel carefully, the map image is enlarged to include the overlapped portion OL, and the map image is larger than the map image in a normal condition. In a case where the second information (e.g., the map image) is displayed on the display area including the overlapped portion OL, the width of the belt-shaped image in the outer area 112 reduces.

In the above embodiment, the length of the belt-shaped image represents a variation of the vehicle speed (corresponding to the first information). A change of the vehicle speed (corresponding to the first information) may be represented by color or brightness of the belt-shaped image. The meter ECU 11 may change a color or brightness of the belt-shaped image according to the numerical value information, which is displayed as the numerical display image. Specifically, the color of the belt-shaped image changes green, yellow, or red in multiple steps. In a case where the vehicle speed is slow (e.g., slower than 40 km/h), the color of the belt-shaped image may be green. In a case where the vehicle speed is medium (e.g., 40 to 80 km/h), the color of the belt-shaped image may be yellow. In a case where the vehicle speed is high (e.g., faster than 80 km/h), the color of the belt-shaped image may be red. In a case where brightness of the belt-shaped image is changed, the display of the belt-shaped image may be brighter (i.e., a brightness of the belt-shaped image may increase) as the vehicle speed becomes high. Incidentally, the color and length of the belt-shaped image may be changed at the same time. In order to improve a sense of unity between the belt-shaped image and the numerical display image, when the color or brightness of the belt-shaped image is changed, a color or brightness of the numerical display image may be changed according to the color or brightness of the belt-shaped image.

In a case where the second information is displayed within the display range which includes the overlapped portion OL, with reducing and displaying the drawing image in the first display area 110, the color of the drawing image or brightness of the drawing image may be changed according to an extent of shrinkage. Specifically, at step S34 and step S35 in FIG. 7, the meter ECU 11 determines the width of the belt-shaped image, and the color or brightness of the belt-shaped image according to the width of the belt-shaped image. In this case, the color of the belt-shaped image may be changed to more distinguished color (i.e., an attention color) as the width of the belt-shaped image becomes narrow (i.e., as the extent of shrinkage is large). For example, in a case where the width of the belt-shaped image is a 100% length, the color of the belt-shaped image may be green. In a case where the width of the belt-shaped image is a 60% length, the color of the belt-shaped image may be yellow. In a case where the width of the belt-shaped image is a 30% length, the color of the belt-shaped image may be red. In another case, as the extent of reduction becomes large, brightness of the belt-shaped image may be brighter.

In a case where the display area of the message in the second display area 120 is determined, according to importance of the message instead of the information volume of the message or according to the information volume, of the message and importance of the message, the display range of the message image may be determined whether the display range includes the overlapped portion OL or not. For example, the importance of the message may be determined according to a person who sends the message, a specified word in the message, or the like. In a case where the importance of the message is high, a font size of the message may become large or limitation of the number of characters may increase.

In the above embodiment, the display condition is set to determine whether the message is displayed with using the overlapped portion OL. In a case where the display condition is satisfied, the message is displayed within the display area which includes the overlapped portion OL (e.g., step S15 and step S16 in FIG. 6). According to contents of the message, even when the display condition is not satisfied, it may be permitted to display the message with the overlapped portion OL. For example, in a case where the message image represents information received from a predetermined information source, regardless of satisfaction of the display condition, the message image may be permitted to be displayed in the overlapped are OL.

The first information, which is continuously displayed on the display panel 31, may be information other than the vehicle speed when the first information can be represented by a numerical value. The display panel 31 may continuously display at least one of the engine speed, the residual fuel, and the water temperature as the first information.

Figure 12A:
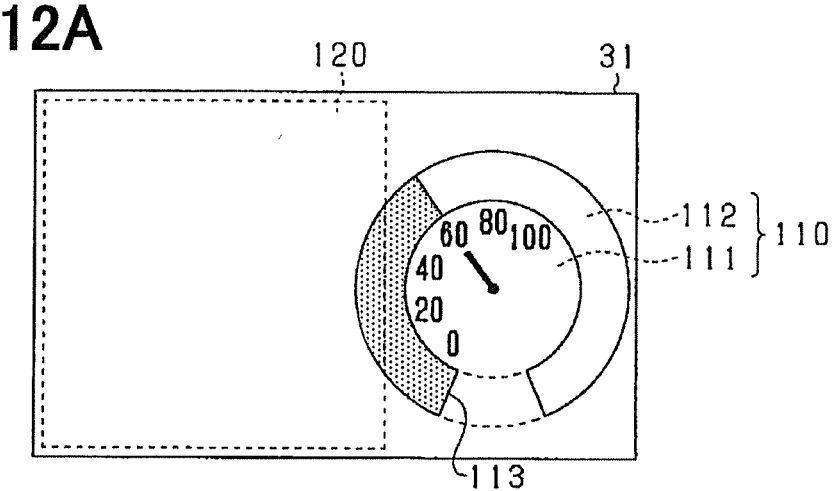
FIG. 12A is a modified example of a numerical display image displayed on the display panel, and illustrates a first example in a case where an instrument board image and an indicator image are displayed.
Figure 12B:
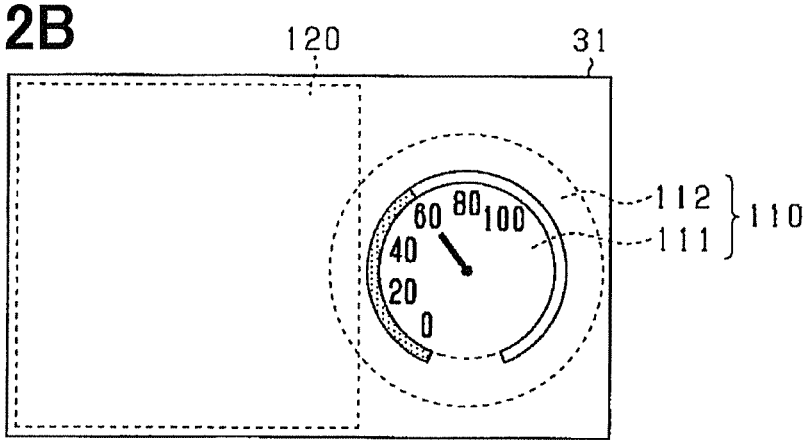
FIG. 12B is a modified example of a numerical display image displayed on the display panel, and illustrates a second example in a case where an instrument board image and an indicator image are displayed.

In the above embodiment, the inner area 111 in the first display area 110 of the display panel 31 displays an image representing Arabic numerals as the numerical display image. The numerical display image may be an instrument board image (e.g., a scale image) with numerals and an indicator image to rotate on the instrument board and to indicate a numerical value according to the vehicle speed. Specifically, as described in FIG. 12A and FIG. 12B, the instrument board image and the indicator image may be provided.

In the above embodiment, the display panel 31 is arranged in front of the driver seat. The display panel 31 may be arranged at the center of a dashboard of the vehicle, for example.

First Example of Second Embodiment

The first example of the second embodiment according to the present disclosure will be explained with reference with drawings. In the present embodiment, the display apparatus is placed in front of the driver's seat in the vehicle. In other words, the display apparatus is placed in front of a steering wheel of the vehicle. The display apparatus selectively displays images, representing traveling basic information, on the display panel. The traveling basic information denotes the vehicle speed, the engine speed or fuel efficiency, for example.

FIG. 1 is a block diagram illustrating an electric configuration of a vehicle display system according to the present disclosure. The display system includes a meter ECU 11 and a body ECU 12, which are in-vehicle ECUs. The meter ECU 11 and the body ECU 12 are communicably connected each other through a serial communication bus 13.

The meter ECU 11 corresponds to a display controller that performs a main control process regarding information display. As described in FIG. 1, the meter ECU 11 includes a CPU 21, an RAM 22, an ROM 23, an input/output (I/O) portion 24, a communication interface 25, and a non-volatile memory 26. The RAM 22 has a working memory. The ROM 23 stores various programs. The non-volatile memory 26 includes a flash memory, for example. The above components are connected through an internal bus 27.

The display system is placed on a position where the display system is visually recognized from a driver's seat (e.g., the position in front of a driver in the present embodiment). The display system includes a display panel 31 which visually displays images of a variety of information. The meter ECU 11 makes a display control for the display panel 31, which is a controlled object. The display panel 31 is an image display panel made from a thin film transistor-color liquid crystal display (a TFT color LCD). Incidentally, the display panel 31 may be another type of display components such as an organic light emitting display or a field emission display.

The meter ECU 11 is connected with a drawing LSI 32, which is a well-known part and corresponds to an image synthesis output controller. The drawing LSI 32 receives a variety of image data, which are to be displayed on the display panel 31, from the meter ECU 11 and synthesizes an image with the graphic memory 33 so that the drawing LSI 32 outputs data representing the synthesized image to the display panel 31. According to this process, an intended image data is arbitrarily displayed at a specified area on the display panel 31. Incidentally, the vehicle display apparatus corresponds to a configuration including the meter ECU 11, the display panel 31, the drawing LSI 32, and the graphic memory 33.

The meter ECU 11 is connected with an operation portion 2034. In addition, the meter ECU 11 is connected through a terminal connecter 2035 with an external apparatus 2036 such as a mobile terminal, including a smartphone.

The operation portion 2034 includes a display instruction switch for instructing the display panel 31 to display information, a mode instruction switch for instructing a traveling mode of the vehicle, another switch for adjusting brightness of the display panel 31, or the like. When the user operates the display instruction switch, a display request for displaying information, such as the engine speed, the fuel efficiency, the water temperature, the residual fuel, the distance to empty, occurs. The meter ECU 11 displays information according to the display request on the display panel 31.

In the present embodiment, the traveling mode of the vehicle includes a normal mode, a power mode, and a fuel-efficiency mode. Acceleration has a priority in the power mode compared with the normal mode. The fuel efficiency has a priority in the fuel-efficiency mode compared with the normal mode. When the user operates the mode instruction switch through the operation portion 2034, one of the above three traveling modes is set. In this case, the body ECU 12 operates a transmission control in an automatic transmission according to the traveling mode, for example.

The terminal connector 2035 connects the meter ECU 11 and the external apparatus 2036 through a universal serial bus (USB) with a wire, for example. The external apparatus 2036 is connected or disconnected by the terminal connector 2035. In a case where the external apparatus 2036 is connected with the terminal connector 2035, the meter ECU 11 automatically detects the external apparatus 2036 and transmits and receives communication information with the external apparatus 2036. Incidentally, the meter ECU 11 may wirelessly communicate with the external apparatus 2036. In this case, a wireless communication portion with, for example, a Bluetooth (registered trademark) may be provided instead of the terminal connector 2035.

The external apparatus 2036 can make a phone call or transmits and receives an e-mail with other terminals or the like. In a condition where the external apparatus 2036 is connected with the terminal connecter 2035, when the external apparatus 2036 receives a phone call or the e-mail, information (corresponding to received information) for indicating reception is sent to the meter ECU 11. When the external apparatus 37 receives the phone call or the e-mail, the meter ECU 11 recognizes the received information, for example, which includes an event of receiving the phone call or the e-mail, information (e.g., a name, a phone number, or an e-mail address) about source, or contents of the e-mail.

The body ECU 12 is connected with a sensor group for obtaining traveling information which is displayed on the display panel 31. The traveling information indicates a condition of the vehicle or an in-vehicle engine. Specifically, the sensor group includes a vehicle speed sensor 41 for detecting the vehicle speed, an engine speed sensor 42 for detecting the engine speed, a residual fuel sensor 43 for detecting a residual quantity of fuel (e.g., gasoline), or a water temperature sensor 44 for detecting water temperature in the engine.

The meter ECU 11 obtains a variety of detected information from the above sensors 41 to 44 through the serial communication bus 13. The meter ECU 11, according to the detected information obtained from the sensors 41 to 44, provides a drawing data of an image which is displayed on the display panel 31.

Figure 13:
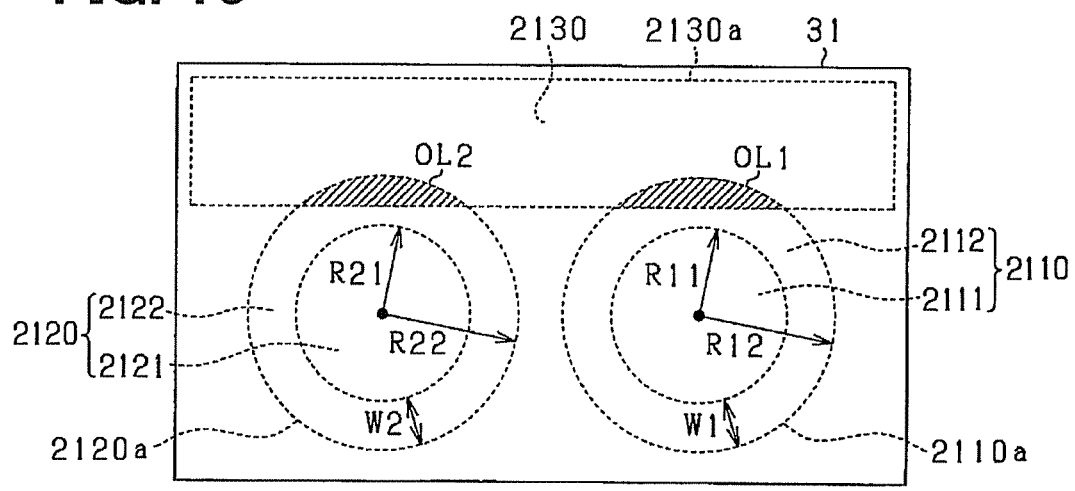
FIG. 13 is a diagram illustrating a partition of a display area in the display panel.

The image display area of the display panel 31 will be explained. In the present embodiment, it is supposed that a variety of information, which is displayed on the display panel 31, includes a third information, a fourth information, and a fifth information. The third information and the fourth information can be represented as numerical value and are continuously displayed on the display panel 31 during vehicle traveling. The fifth information is different from the third information and the fourth information. The fifth information is displayed on the display panel 31 according to a display request which is occurred during vehicle traveling. Images of the third information, the fourth information, and the fifth information are displayed on different areas on the display panel 31. Partitioning in the display panel 31 will be explained with reference, to FIG. 13. FIG. 13 is a front view of the image display area of the display panel 31.

In FIG. 13, the display panel 31 includes a third display area 2110 and a fourth display area 2120. The third display area 2110 displays the third information and the fourth display area 2120 displays the fourth information. The third display area 2110 and the fourth display area 2120 are placed from side to side. The third display area 2110 and a fifth display area 2130 overlap partially. The fourth display area 2120 and the fifth display area 2130 overlap partially. The third display area 2110 is a circular area which has a circular shape. The end of the third display area 2110 corresponds to an outer periphery edge 2110*a* and the third information is displayed on an inner area of the outer periphery edge 2110*a*. The fourth display area 2120 is a circular area which has a circular shape. The end of the fourth display area 2120 corresponds to an outer periphery edge 2120*a* and the fourth information is displayed on an inner area of the outer periphery edge 2120*a*. The fifth display area 2130 is a rectangular area which has a rectangular shape. The end of the fifth display area 2130 corresponds to an outer periphery edge 2130*a* and the fifth information is displayed on an inner area of the outer periphery edge 2130*a*.

Herein, the third display area 2110 and the fourth display area 2120 display numerical information. The third information denotes the vehicle speed so that the vehicle speed is displayed on the third display area 2110. The fourth information denotes traveling information other than the vehicle speed (the third information). For example, the fourth information includes the engine speed, the fuel efficiency, the water temperature, the traveling distance, the residual fuel, or the distance to empty. One of the above fourth information is selected to be displayed on the fourth display area 2120. The fifth information denotes a message about received information which is received from the external apparatus 2036. The message, which is horizontally expressed as character, is displayed on the fifth display area 2130.

The third display area 2110 has an inner area 2111, which has a circular shape, and an outer area 2112, which is arranged around the inner area 2111 and has a ring shape. The inner area 2111 and the outer area 2112 have the same center point. A radius of the inner area 2111 corresponds to R11. The radius of the outer area 2112 corresponds to R12. The outer area 2112 has a constant width, represented by W1. The fourth display area 2120 has an inner area 2121, which has a circular shape, and an outer area 2122, which is arranged around the inner area 2121 and has a ring shape. The inner area 2121 and the outer area 2122 have the same center point. A radius of the inner area 2121 corresponds to R21. The radius of the outer area 2122 corresponds to R22. The outer area 2122 has a constant width, represented by W2. Incidentally, in the present embodiment, the third display area 2110 and the fourth display area 2120 have the same shape and the same size, and therefore, R11 is equal to R21, R12 is equal to R22, and W1 is equal to W2.

In the inner area 2111 and the outer area 2112 of the third display area 2110, the vehicle speed is displayed as the third information. Although images representing the vehicle speed, based on the same vehicle speed information, are displayed on the inner area 2111 and the outer area 2112, display modes are different between the inner area 2111 and the outer area 2112. In the inner area 2111, the vehicle speed is displayed as a numerical display image (e.g., an image representing an Arabic number). In the outer area 2112, the vehicle speed is displayed as a belt-shaped image whose length is changed according to the vehicle speed.

The fourth information is at least one of the engine speed, the fuel efficiency, the water temperature, the residual fuel, and the distance to empty. The fourth information is displayed on the inner area 2121 and the outer area 2122 of the fourth display area 2120. The display modes are similar to a case in the third information. In the inner area 2121, for example, the engine speed is displayed as a numerical display image (e.g., an image representing an Arabic number). In the outer area 2122, the engine speed is displayed as the belt-shaped image whose length is changed according to the engine speed.

Figure 14A:
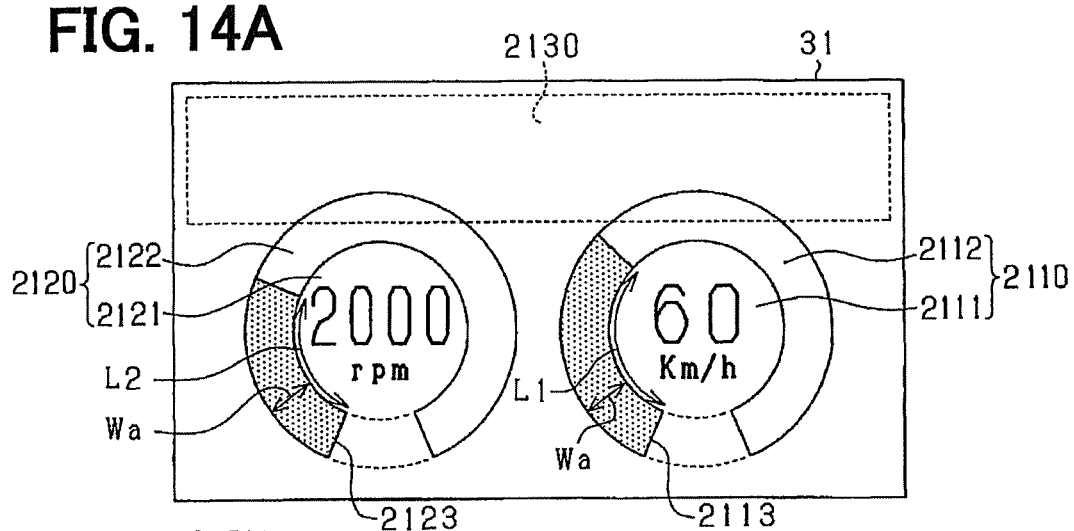
FIG. 14A is a diagram illustrating a third display area and a fourth display area in the display panel.

More specifically, as described in FIG. 14A, the vehicle speed information is displayed within the inner area 2111 as the numerical display image such as 60 km/h. The vehicle speed information is displayed within the outer area 2112 as the belt-shaped image with the length L1, which is measured from a base portion 2113. The engine speed information is displayed within the inner area 2121 as the numerical display image such as 2000 rpm. The engine speed information is displayed within the outer area 2122 as the belt-shaped image with the length L2, which is measured from a base portion 2123. The length of these belt-shaped images is variable. The belt-shaped images are an arc image with an arc-like shape. As the vehicle speed increases, the length L1 of the belt-shaped image elongates. As the engine speed increases, the length L2 of the belt-shaped image elongates.

The numerical display image and the belt-shaped image displayed on the third display area 2110 correspond to a first numerical display image and a first belt-shaped image, respectively. The numerical display image and the belt-shaped image displayed on the fourth display area 2120 correspond to a second numerical display image and a second belt-shaped image, respectively.

A size and a position of the inner area 2111 are constant. A size and a position of the inner area 2121 are constant. Thus, the inner area 2111 consistently displays the numerical display image for representing the vehicle speed in a constant manner, and the inner area 2121 consistently displays the numerical display image for representing the engine speed in a constant manner. According to this feature, in a case when a driver reads the information from the numerical display image, it is enough for the driver to look at the same position consistently and it is possible that the driver reads the information easily. It is possible to recognize the vehicle speed or the engine speed intuitively by looking at the belt-shaped image displayed within the outer area 2112 or the outer area 2122, without reading the numerical value.

In addition, a width of the belt-shaped image in the outer area 2112 is variable within a display range that is defined by the width W1 of the outer area. A width of the belt-shaped image in the outer area 2122 is variable within a display range that is defined by the width W2 of the outer area. The widths of the display range of the belt-shaped images are set individually so that a size of the display range which can be displayed is different in between the third display area 2110 and the fourth display area 2120. Incidentally, the display range in which the belt-shaped image is displayed within each of the third display area 2110 and the fourth display area 2120 is referred to as a belt-shaped image display range. By differentiating a size (e.g., width) of the belt-shaped image display range each other, it is possible to differentiate a size (e.g., width) of each of the belt-shaped images. The outer areas 2112, 2122 have an inner peripheral side and an outer peripheral side. In a case where the width of the belt-shaped image shrinks, the width of the belt-shaped image becomes narrower from the outer peripheral side of the outer areas 2112, 2122. According to this feature, when the width of the belt-shaped image shrinks, an image in a portion where the belt-shaped image contacts with the inner areas 2111, 2121 does not change. The portion corresponds to a boundary portion defined by the inner peripheral side of the outer areas 2112, 2122 and an outer side of the inner areas 2111, 2121, respectively. Thus, it is possible to keep a relationship between the inner areas 2111, 2121 and the outer areas 2112, 2122, respectively. In summary, it is possible that the sizes of the belt-shaped images are different in the third display area 2110 and the fourth display area 2120 without changing the size and the position of each of the numerical display images in the third display area 2110 and the fourth display area 2120.

Figure 14B:
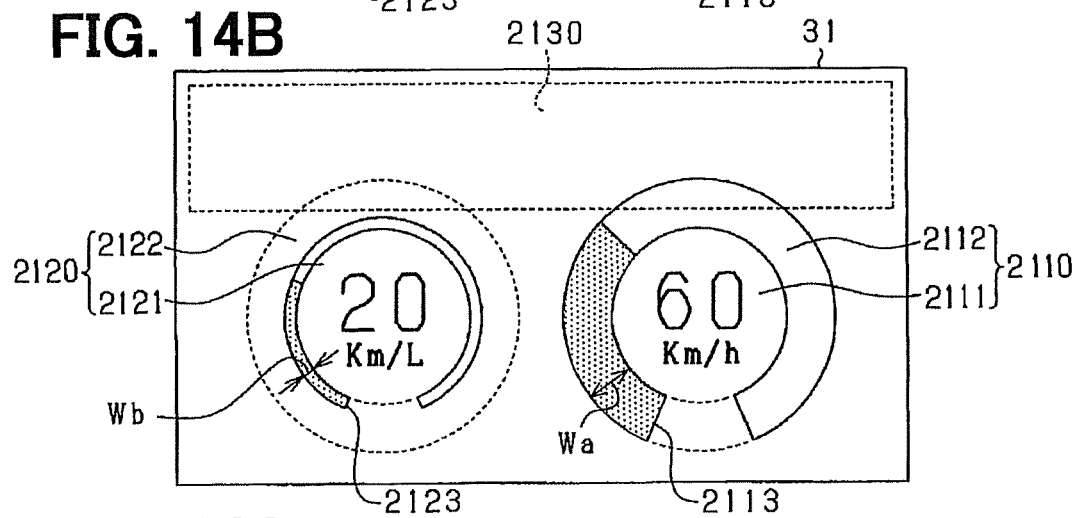
FIG. 14B is a diagram illustrating a third display area and a fourth display area in the display panel, in a case where a normal traveling mode is selected as a traveling mode.

According to the information that is displayed as the fourth information, a width dimension of the belt-shaped image display range is changed. For example, in FIG. 14A, the third information represents the vehicle speed and the fourth information represents the engine speed. In this case, the widths of the belt-shaped image display ranges in the first belt-shaped image and the second belt-shaped image correspond to Wa (i.e., Wa is equal to W1, and Wa is equal to W2). In FIG. 14B, the third information represents the vehicle speed, and the fourth information represents the fuel efficiency. In this case, the width of the belt-shaped image display range in the second belt-shaped image shrinks to be Wb (i.e., Wb is less than W1).

Figure 14C:
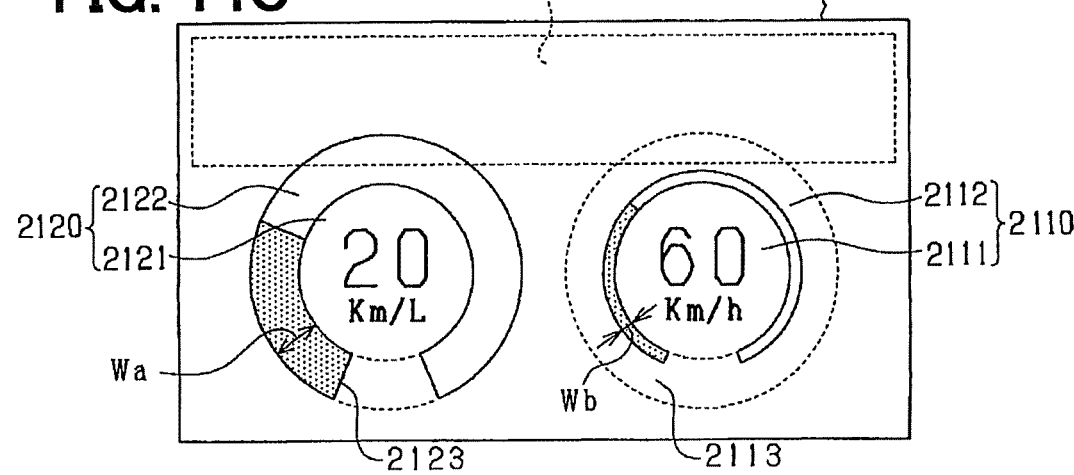
FIG. 14C is a diagram illustrating a third display area and a fourth display area in the display panel, in a case where a fuel-efficiency mode is selected as the traveling mode.

In the present embodiment, in a case where the sizes of the belt-shaped image display range are different from each other, according to the traveling mode of the vehicle, the sizes of the belt-shaped image display ranges are differentiated. In FIG. 14B and FIG. 14C, the third information represents the vehicle speed, and the fourth information represents the fuel efficiency. In FIG. 14B, the normal traveling mode is selected as the traveling mode. In FIG. 14C, the fuel-efficiency mode is selected as the traveling mode. In this case, in FIG. 14B, the width of the belt-shaped image display range of the first belt-shaped image is set to Wa, and the width of the belt-shaped image display range of the second belt-shaped image is set to Wb. In FIG. 14C, in order to maximize the visibility of the fuel efficiency information, the width of the belt-shaped image display range of the first belt-shaped image shrinks to be Wb, and the width of the belt-shaped image display range of the second belt-shaped image is enlarged to be Wa.

Since the inner areas 2111, 2121 display the third information or the fourth information at a fixed position, the inner areas 2111, 2121 correspond to a fixed display area. Since the outer areas 2112, 2122 subsidiary display the third information or the fourth information, in addition to the numerical display image, the outer areas 2112, 2122 correspond to a subsidiary display area.

In the present embodiment, as a default image of the display panel 31 after turning on a power switch of the vehicle, as described in FIG. 14A, the third display area 2110 displays the vehicle speed and the fourth display area 2120 displays the engine speed. In a case where a display request about the fourth information other than the engine speed occurs during vehicle traveling, according to the display request, the fourth information to be displayed is changed from the vehicle speed to the other information (e.g., the fuel efficiency).

After turning on the power switch of the vehicle, an opening image (including an animation image) may be displayed before the default image as described in FIG. 14A is displayed on the display panel 31. The opening image denotes an image or an animation image which is especially displayed when the power switch of the vehicle turns on. In a case where the vehicle stops (i.e., in a non-traveling state) after turning on the power switch, it is possible to display information different from the above described traveling basic information or to turn off (i.e., stop displaying) the display panel 31 for power saving.

As described in FIG. 13, the fifth display area 2130 is provided to overlap with only the outer areas 2112, 2122 of the third display area 2110 and the fourth display area 2120. A hatched area indicates overlapped portions OL1, OL2 where the fifth display area 2130 overlaps with the third display area 2110 or the fourth display area 2120. The fifth information, which is displayed on the fifth display area 2130, may be changed between a display state and a non-display state. In the display state, it is possible to change the size (especially, the height) of the fifth display area 2130.

Figure 15A:
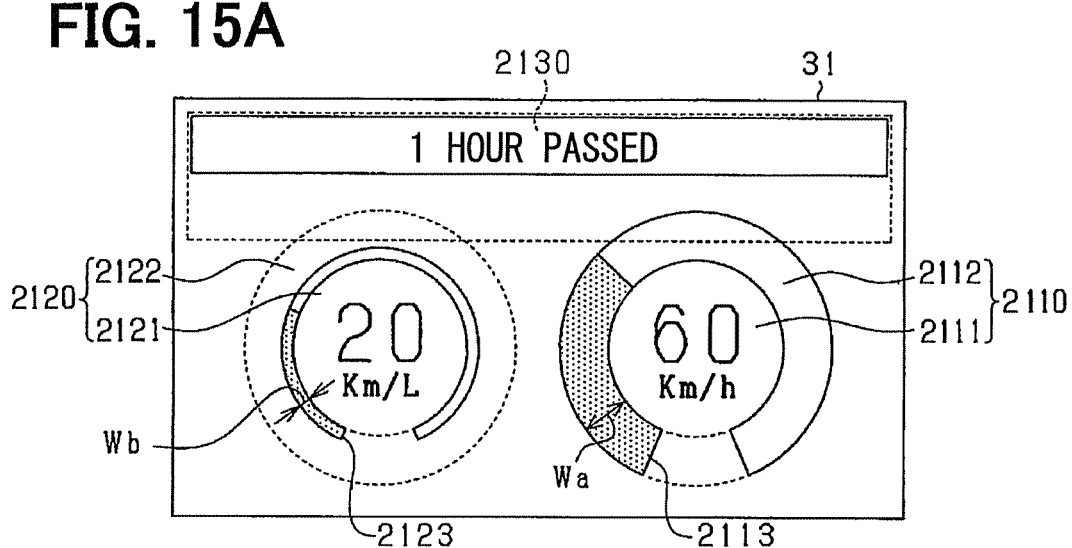
FIG. 15A is a diagram illustrating a fifth display area in the display panel, and illustrates a first example when a display request of a message occurs.
Figure 15B:
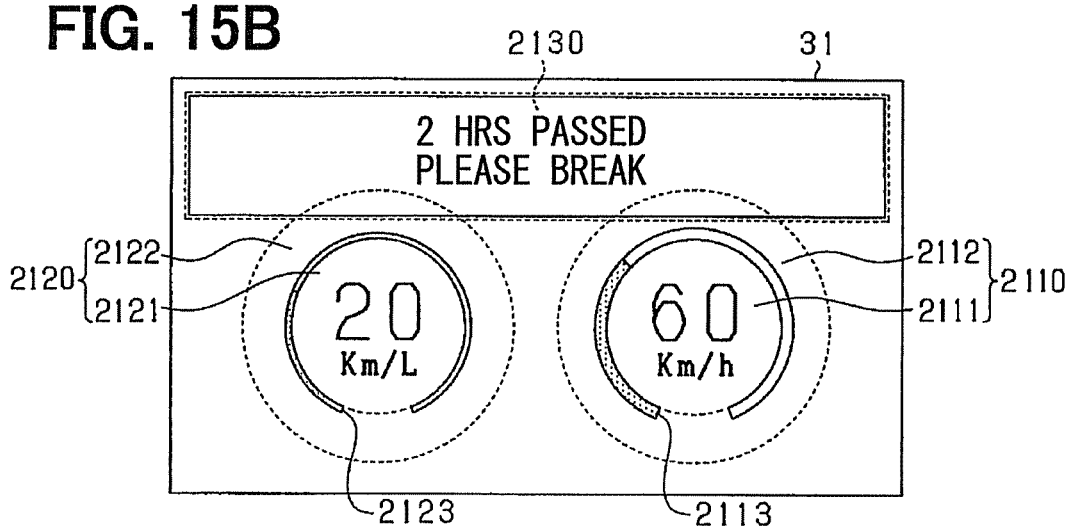
FIG. 15B is a diagram illustrating a fifth display area in the display panel, and illustrates a second example when the display request of a message occurs.

In a case where the message about the received information of the external apparatus 2036 is displayed as the fifth information, as described in FIG. 15, the message image is displayed on the fifth display area 2130. A display range of the message image in the fifth display area 2130 is variably set according to the amount of message information each time. In FIG. 15A, the message image is displayed within a display range which does not include the overlapped portions OL1, OL2 in the fifth display area 2130. In FIG. 15B, the message image is displayed within a display range which includes the overlapped portions OL1, OL2. In a case where the message image is displayed within the display range which includes the overlapped portions OL1, OL2, the width of the belt-shaped image display range of each of the first belt-shaped image and the second belt-shaped image shrinks.

In FIG. 15A and FIG. 15B, the sizes (i.e., the widths) of the belt-shaped images displayed on the third display area 2110 and the fourth display area 2120 are different from each other. As described in FIG. 15B, in a case where the message image is displayed within the display range which includes the overlapped portions OL1, OL2, the widths of each of the belt-shaped images shrink with keeping a size ratio of the belt-shaped images. In other words, the widths of each of the belt-shaped images shrink with keeping a magnitude correlation.

It may be possible that the fifth information includes information about a failure of the vehicle or the engine, or information about vehicle traveling safety, and that a message about the above fifth information is displayed on the display panel 31. In this case, when the vehicle or the engine has a difficulty, the meter ECU. 11 may cause the fifth display area 2130 of the display panel 31 to display the message about the difficulty. According to this, with keeping the visibility of the third information and the fourth information, the driver may be informed that the vehicle should be traveled for evacuation. The meter ECU 11 may determine tiredness of the driver based on the vehicle traveling distance or traveling time and may display a message about the tiredness on the fifth display area 2130 of the display panel 31.

Figure 16:
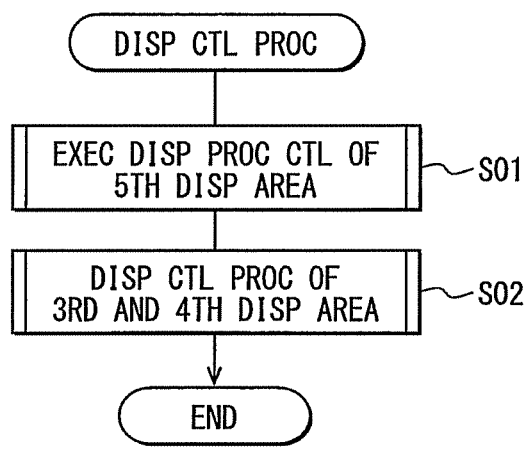
FIG. 16 is a flow chart illustrating a main routine of a display control process.

A display control process performed by the meter ECU 11 will be explained. FIG. 16 is a flow chart illustrating a main routine of the display control process. The display control process is repeatedly performed by the meter ECU 11 at a predetermined time period.

In FIG. 16, at step S201, the meter ECU 11 performs a display control about the fifth display area 2130. At step S202, the meter ECU 11 performs a display control about the third display area 2110 and the fourth display area 2120. The display control of the fifth display area 2130 will be explained with a subroutine in FIG. 17. The display control of the third display area 2110 and the fourth display area 2120 will be explained by a subroutine in FIG. 18. Incidentally, in FIG. 18, one of the engine speed and the fuel efficiency is selected as the fourth information, and the selected fourth information is displayed on the fourth display area 2120.

Figure 17:
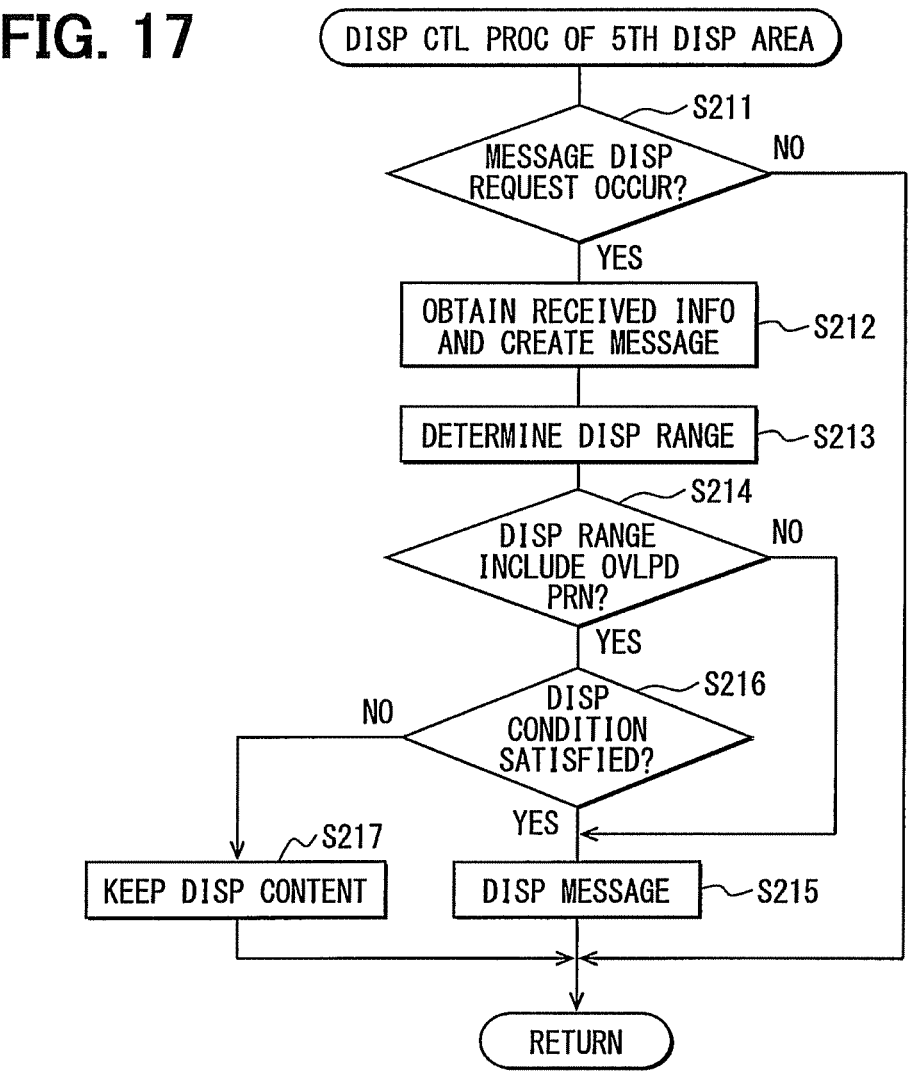
FIG. 17 is a flow chart illustrating a display control of the fifth display area.

In FIG. 17, at step S211, the meter ECU 11 determines whether a message display request occurs for requesting the display panel 31 to display the message image. In a case where the message display request does not occur, the display control process ends and returns to the main routine. In a case where the message display request occurs, the process proceeds to step S212. At step S212, the received information is obtained from the external apparatus 2036, and based on the received information, the meter ECU 11 creates a message to be displayed on the display panel 31. When the message is created, at least one of the following messages is created: (1) a message indicating a receiving of a phone call or an e-mail, (2) a message indicating a source of the phone call or the e-mail, or (3) a message corresponding to a title or contents of the e-mail (when the e-mail is received). Incidentally, a user may perform a setting operation to determine which of the message is created in the above messages (1) to (3), for example.

At step S213, the meter ECU 11 determines the display range in the fifth display area 2130 with respect to the above created message. Based on the amount of the information volume (e.g., the number of characters) of the message, the meter ECU 11 determines whether the display range of the message includes the overlapped portions OL1, OL2 or not.

At step S214, the meter ECU 11 determines whether the display range of the message on this occasion includes the overlapped portions OL1, OL2. In a case where the display range of the message does not include the overlapped portions OL1, OL2, the process proceeds to step S215. At step S215, the message created at step S212 is displayed within the display range determined at step S213.

In a case where the display range includes the overlapped portions OL1, OL2 at step S214, the process proceeds to step S216. At step S216, the meter ECU 11 determines a display condition that the message may be displayed with the overlapped portions OL1, OL2. The display condition is determined based on a traveling state of the vehicle. Specifically, the display condition includes a condition where the vehicle is not in a high-speed traveling, or where a traveling path is not a winding road (i.e., the path does not have many corners), for example. Incidentally, it may be determined that the vehicle is not in the high-speed traveling when the vehicle speed is equal to or less than a predetermined value (e.g., 80 km/h). It may be determined whether the traveling path of the vehicle is a winding road, based on map information of a navigation apparatus or frequency of a steering wheel operation by the driver, for example. The navigation apparatus may be provided by the external apparatus 2036.

In a case where the display condition is satisfied, the process proceeds to step S215. The meter ECU 11 displays the message created at the above step S212 on the display range determined at step S213 (herein, including the overlapped portions OL1, OL2). In a case where the display condition is not satisfied, the process proceeds to step S217. At step S217, the meter ECU 11 does not display the message, which is created based on the received information on this occasion, and the meter ECU 11 keeps a content of a previous time in the fifth display area 2130. The process returns to the main routine.

In summary, when the message is displayed within the display range which includes the overlapped portions OL1, OL2, the display areas (actually, the outer area 2112 and the outer area 2122) of the third information in the third display area 2110 and the fourth information in the fourth display area 2120 are reduced by the overlapped portions OL1, OL2. Thus, the visibility of the third information and the fourth information degrades. Accordingly, depending on the traveling state, the visibility for the vehicle speed has the highest priority for a reason of safety to travel. Thus, in a case where the display condition is not satisfied, the message is not displayed. The visibility of the vehicle speed has a high priority and it is possible to maximize the visibility of the vehicle.

At step S217, the message information (i.e., the message information provided in the display range which includes the overlapped portions OL1, OL2) is temporarily stored, and the process returns to the main routine. When the display control process of the fifth display area 2130 is performed again and the display condition is satisfied at step S216, the message is displayed on the fifth display area 2130.

Figure 18:
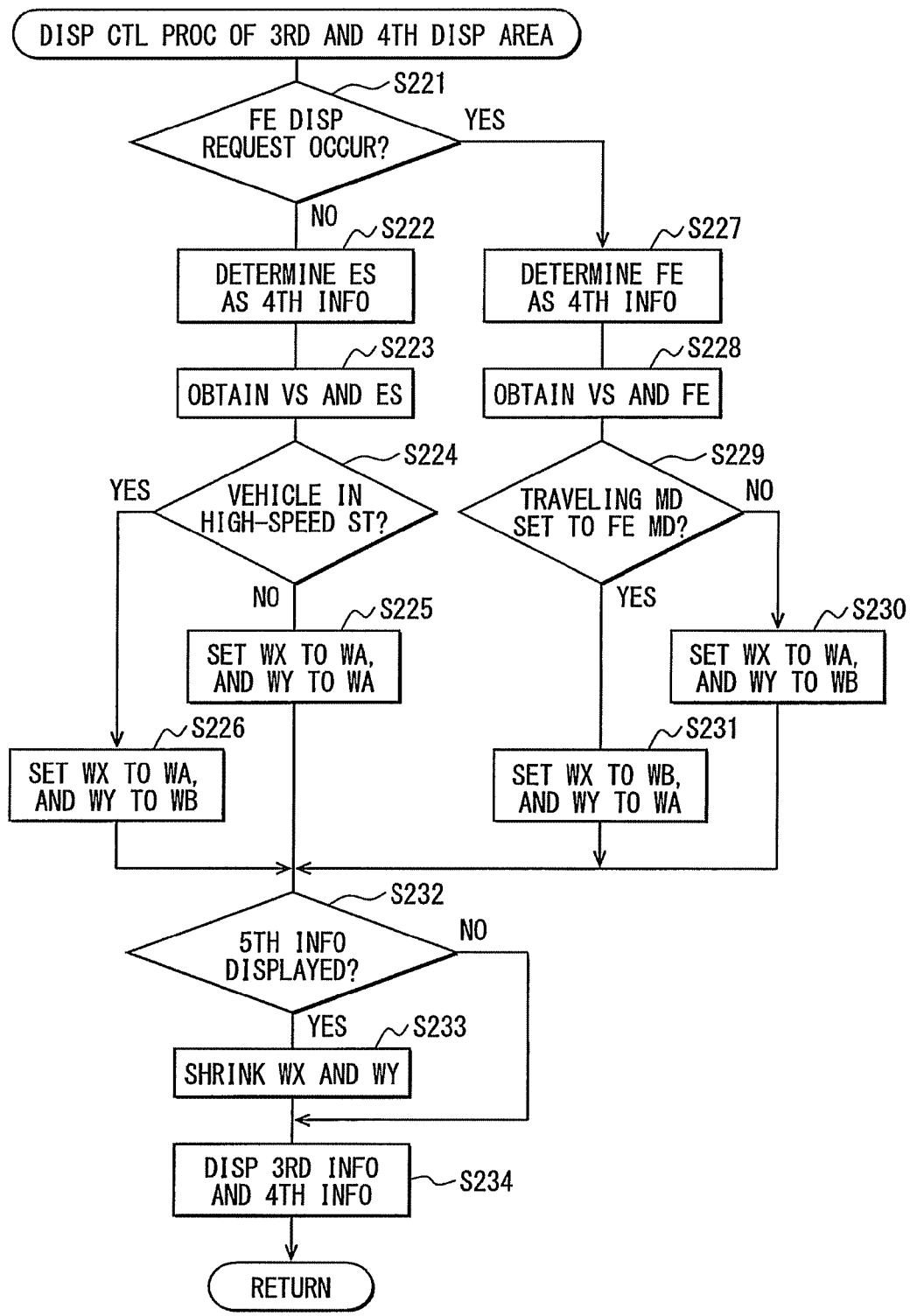
FIG. 18 is a flow chart illustrating a display control of the third display area and the fourth display area.

In FIG. 18, at step S221, the meter ECU 11 determines whether a fuel efficiency display request occurs. The fuel efficiency display request is a request for displaying fuel efficiency information as the fourth information on the display panel 31. In a case where the fuel efficiency display request does not occur ("NO" at step S221), the process proceeds to step S222. At step S222, the meter ECU 11 determines that the engine speed is displayed as the fourth information. At step S223, the vehicle speed and the engine speed are obtained. At step S224, the meter ECU 11 determines whether the vehicle is in a high-speed traveling state. When the vehicle speed is equal to or more than a predetermined value (e.g., 80 km/h), it is determined that the vehicle is in the high-speed traveling state.

In a case where the vehicle is not in the high-speed traveling state, the process proceeds to step S225. At step S225, since the third information is the vehicle speed and the fourth information is the engine speed, a width WX in the first belt-shaped image and a width WY in the second belt-shaped image are set to Wa. Herein, the width WX corresponds to a width of the display range of the belt-shaped image of the first belt-shaped image. The width WY corresponds to a width of the display range of the belt-shaped image of the second belt-shaped image. In a case where the vehicle is in the high-speed traveling state, the process proceeds to step S226. At step S226, in order to easily distinguish vehicle information by differentiating the sizes of the two belt-shaped images, the width WX in the first belt-shaped image is set to Wa and the width WY in the second belt-shaped image is set to Wb.

At step S221, in a case where the fuel efficiency display request occurs ("YES" at step S221), the process proceeds to step S227. At step S227, the meter ECU 11 determines whether the fuel efficiency is displayed as the fourth information. At step S228, the vehicle speed and the fuel efficiency are obtained. At step S229, the meter ECU 11 determines whether the fuel-efficiency mode is selected as the traveling mode of the vehicle.

In a case where the fuel-efficiency mode is not selected as the traveling mode of the vehicle i.e., the normal traveling mode or the power mode is selected ("NO" at step S229), the process proceeds to step S230. At step S230, since the third information is the vehicle speed and the fourth information is the fuel efficiency, the width WX of the display range of the belt-shaped image of the first belt-shaped image is set to Wa and the width WY of the display range of the belt-shaped image of the second belt-shaped image is set to Wb. In short, the belt-shaped image representing the vehicle speed is displayed larger than the belt-shaped image representing the fuel efficiency. In a case where the fuel-efficiency mode is selected as the traveling mode of the vehicle ("YES" at step S229), the process proceeds to step S231. At step S231, the width WX in the first belt-shaped image is set to Wb and the width WY in the second belt-shaped image is set to Wa. In short, the belt-shaped image representing the fuel efficiency is displayed larger than the belt-shaped image representing the vehicle speed.

After step S225, step S226, step S230, or step S231, at step S232, the meter ECU 11 determines whether the fifth information (i.e., the message image) is displayed within the display range which includes the overlapped portions OL1, OL2. In a case where the fifth information is displayed within the display range which includes the overlapped portions OL1, OL2, the process proceeds to step S233. At step S233, the meter ECU 11 determines the width WX of the display range of the belt-shaped image in the first belt-shaped image and the width WY of the display range of the belt-shaped image in the second belt-shaped image, based on the display range of the fifth information. In short, each of the belt-shaped images shrinks according to the display range of the fifth information. At step S234, the vehicle speed as the third information is displayed as the numerical display image and the belt-shaped image, and at least one of the engine speed and the fuel efficiency as the fourth information is displayed as the numerical display image and the belt-shaped image, and the process ends.

Technical advantages according to the present embodiment will be described below.

In the third display area 2110 and the fourth display area 2120 of the display panel 31, the third information and the fourth information, which can be displayed by numerals, are displayed as the numerical display images and as the belt-shaped images. According to this feature, it is possible that the driver correctly recognizes the third information and the fourth information through the numerical display images, and intuitively recognizes the third information and the fourth information through the belt-shaped images at a glance. It is possible to improve the visibility of the display panel 31.

Size and position of the numerical display images in the third display area 2110 and the fourth display area 2120 are constant, and sizes of the display range of the belt-shaped images in the third display area 2110 and the fourth display area 2120 are different from each other. According to this, in a case where multiple images, representing multiple information items, are displayed on the display panel 31 from side to side, it is possible to differentiate the sizes of the belt-shaped images and it is possible to easily distinguish the images, arranged from side to side. In addition, since the numerical display image, which is displayed to be surrounded by the belt-shaped image, is constant in size and position, a user (e.g., a driver) can easily recognize numerals, representing information, after user's eye moves to either the third display area 2110 or the fourth display area 2120 in the display panel 31. According to this feature, the multiple images, which are displayed on the display panel 31, are caused to be easily distinguished and it is possible to improve the visibility of a display image.

The fourth information includes multiple information items whose displayed contents are different from each other. According to a combination of the displayed contents of the third information and the fourth information, sizes (i.e., width) of the display range of the belt-shaped image of the multiple information items are differentiated (e.g., step S225 or step S230 in FIG. 18). According to this, in a case where a specific combination of the multiple information items is displayed on the display panel 31, the sizes of the belt-shaped images are essentially constant. Thus, it is possible to prevent inconvenience that the sizes of the belt-shaped images change and the visibility reduces. In addition to a case where the sizes of the belt-shaped images are differentiated, another case, where the belt-shaped images have the same size, is determined and therefore it is possible to realize many display modes.

Based on the traveling state of the vehicle, the sizes (i.e., width) of the belt-shaped images, representing information, are differentiated (e.g., step S225 or step S226 in FIG. 18). According to this feature, for example, in a case where the vehicle is in the high-speed traveling state, it is easy to distinguish the vehicle information so that this feature may contribute to safe traveling.

In a case where the fourth information is the fuel efficiency and the traveling mode of the vehicle is in the fuel-efficiency mode, the belt-shaped image of the fourth information is larger than the belt-shaped image of the third information (e.g., step S231 in FIG. 18). According to this, for example, in a case where the vehicle is in the fuel-efficiency mode and it is supposed that the driver cares about the fuel efficiency, it may be possible to easily distinguish the fuel information from other information.

In the display panel 31, the fifth display area 2130 is arranged to partially overlap with the third display area 2110 and the fourth display area 2120. The fifth information (i.e., the message image) is displayed or not according to the display request. That is, a display state of the fifth information is changeable between a display state and a non-display state. In the fifth display area 2130, in a case where the fifth information is displayed on the overlapped portion OL1, which overlaps with the third display area 2110, or the overlapped portion OL2, which overlaps with the fourth display area 2120, in order to prevent from overlapping with the image of the fifth information, the belt-shaped images of the third display area 2110 and the fourth display area 2120 shrink and are displayed.

According to this, with using the limited display area of the display panel 31 effectively, it is possible to appropriately display the third information, the fourth information, and the fifth information (i.e., the message image). In this case, about the third information and the fourth information, only the belt-shaped images, which is subsidiary displayed, shrink to be displayed. The numerical display images do not change at all. Thus, the visibility of the numerical display image is kept to the driver. In addition, although the belt-shaped images shrink, the first belt-shaped image and the second belt-shaped image are differently displayed so that a situation is continued where it is easy to distinguish the third information with the fourth information.

Other Example of Second Embodiment

Figure 19A:
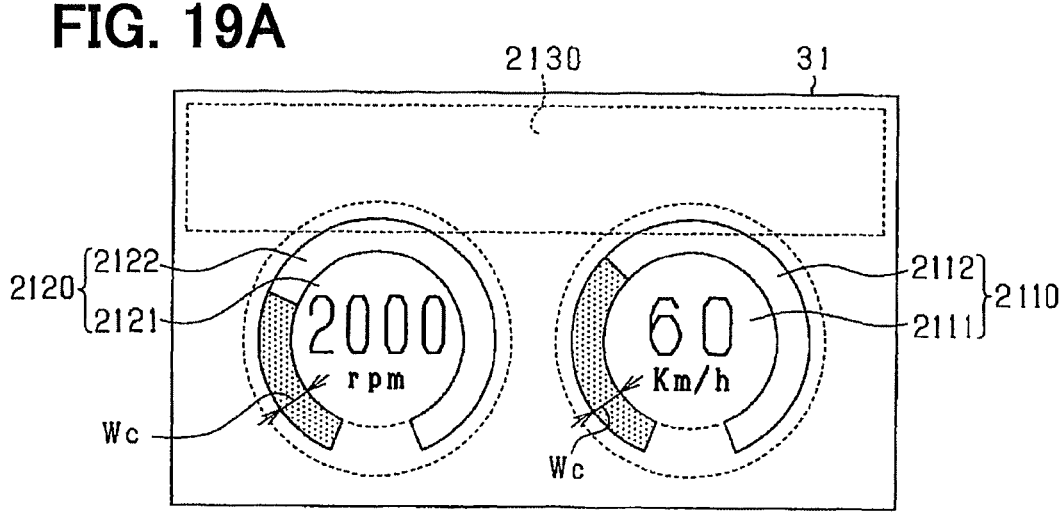
FIG. 19A is a diagram illustrating a display area in the display panel, in a default state.
Figure 19B:
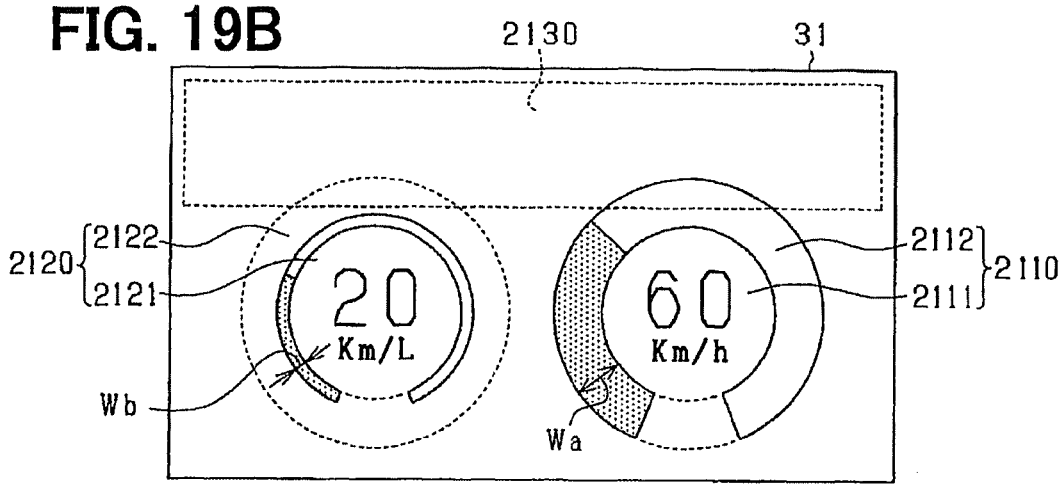
FIG. 19B is a diagram illustrating a display area in the display panel, in a case where sizes of belt-shaped display ranges are differentiated.

In the above embodiment, in a case where the sizes of the belt-shaped display range in the third display area 2110 and the fourth display area 2120 are differentiated, one of the belt-shaped display ranges of the third display area 2110 and the fourth display area 2120 is kept in size and the other shrinks in size, compared to a default size as a standard. Alternatively, it may be possible to change the sizes of the belt-shaped display ranges of the third display area 2110 and the fourth display area 2120. For example, one of the belt-shaped display ranges of the third display area 2110 and the fourth display area 2120 may enlarge, and the other may shrink in size, compared with the default size as the standard so that the sizes of the belt-shaped display range in the third display area 2110 and the fourth display area 2120 are differentiated. Specifically, in FIG. 19A and FIG. 19B, FIG. 19A illustrates an image in the default state, and the width of the belt-shaped display range in the third display area 2110 and the fourth display area 2120 corresponds to Wc (herein, Wc is larger than Wb and less than Wa, W1 and W2 are equal to Wc). In a case where the sizes of the belt-shaped, display ranges are differentiated, as described in FIG. 19B, the width of the belt-shaped image of the third display area 2110 is enlarged from Wc to Wa, and the width of the belt-shaped image of the fourth display area 2120 is shrunken from Wc to Wb.

Although the fourth information includes multiple information items, the fourth information may include a single information. For example, the fourth information may include only the engine speed information. In this case, a combination of the third information and the fourth information is fixed to a combination of the vehicle speed information and the engine speed information. For example, in a case where the traveling mode of the vehicle is in the power mode, the width of the belt-shaped display range for the second belt-shaped image is larger than the width of the belt-shaped display range for the first belt-shaped image, and the visibility of the engine speed information improves. According to this, it is possible to match a display mode of the display panel 31 with the traveling state of the vehicle.

In the above embodiment, only the vehicle speed information is displayed as the third information on the third display area 2110. The third information may include multiple information items. The widths of the first belt-shaped image and the second belt-shaped image are set according to a combination of the third information and the fourth information, based on the traveling state of the vehicle.

In a case where the displayed content in the display panel 31 is changed (for example, a case where the engine speed as the fourth information is changed to the fuel efficiency), the size (width) of the belt-shaped display range of a newly displayed content, which is changed, may temporarily enlarge. In short, until a predetermined period is passed from a change of the display content, the sizes of the belt-shaped display ranges are different from each other. After the predetermined period is passed, the belt-shaped display ranges have the same size. For example, in a case where, according to the fuel efficiency display request, the widths of the belt-shaped display ranges are differentiated (e.g., step S230 or step S231 in FIG. 18), the widths of the belt-shaped display ranges are different for the predetermined period after the fuel efficiency display request has occurred.

In a case where the belt-shaped display ranges of the third display area 2110 and the fourth display area 2120 are differentiated, size ratio of each of the belt-shaped display range may change. In this case, the size ratio of each of the belt-shaped display range may be adjusted according to a combination of the third information and the fourth information, the traveling state of the vehicle or the like. For example, in a case where the vehicle speed is displayed as the third information and the distance to empty is displayed as the fourth information, as the distance to empty decreases, the width of the belt-shaped display range of the first belt-shaped image decrease and the width of the belt-shaped display range of the second belt-shaped image increases.

Figure 20:
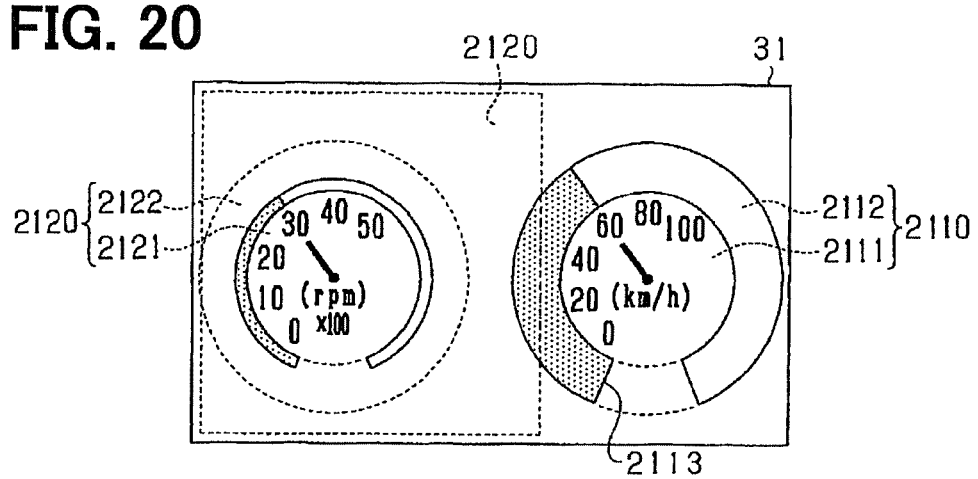
FIG. 20 is another modified example of a numerical display image displayed on the display panel.

In the above embodiment, in the inner area 2111 of the third display area 2110 and the inner area 2121 of the fourth display area 2120 in the display panel 31, the image representing the Arabic numeral is displayed as the numerical display image. The numerical display image may be an instrument board image (e.g., a scale image) with numerals and an indicator image to rotate on the instrument board and indicate a numerical value according to the vehicle speed. Specifically, as described in FIG. 20, the instrument board image and the indicator image may be displayed on the inner area 2111 of the third display area 2110 and the inner area 2121 of the fourth display area 2120.

In the above embodiment, in a case where the fifth information (i.e., the message image) is displayed with overlapping with the third display area 2110 and the fourth display area 2120, each of the belt-shaped images shrinks with keeping the size ratio (i.e., a magnitude correlation) of the belt-shaped display range (with reference to FIG. 15A and FIG. 15B). The belt-shaped display ranges may have the same size and the belt-shaped images may shrink. In other words, size differentiation of the belt-shaped display ranges may be cancelled and the belt-shaped images may shrink. For example, each of the belt-shaped display ranges has the same size, and the size of each of the belt-shaped display ranges may be determined so that each of the belt-shaped display ranges is in a maximum size in a situation described in FIG. 15B. In this case, since the fifth information is displayed and the belt-shaped images shrink, size difference of the belt-shaped images is not easy to recognize. Thus, improvement of the visibility has priority over differentiation in size.

In the above embodiment, the third display area 2110 and the fourth display area 2120 have the same shape and the same size (referring to FIG. 13). The third display area 2110 and the fourth display area 2120 may have different size, for example.

In the above embodiment, the fifth display area 2130 in the display panel 31 is arranged above the third display area 2110 and the fourth display area 2120. The fifth display area 2130 may be arranged at another position. For example, the fifth display area 2130 may be arranged between the third display area 2110 and the fourth display area 2120. The fifth information is not limited to the message, and a night-vision image in front of the vehicle or a navigation image may be displayed as the fifth information. Incidentally, the fifth display area 2130 may be omitted.

Figure 21A:
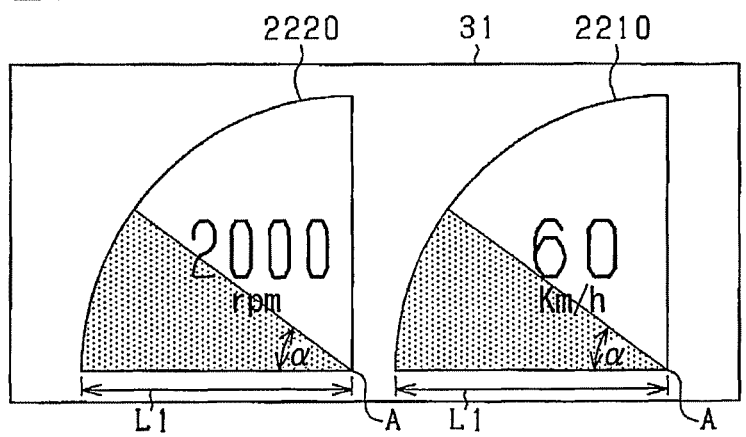
FIG. 21A is another modified example of the display area in the display panel, in a case where drawing images have the same size.
Figure 21B:
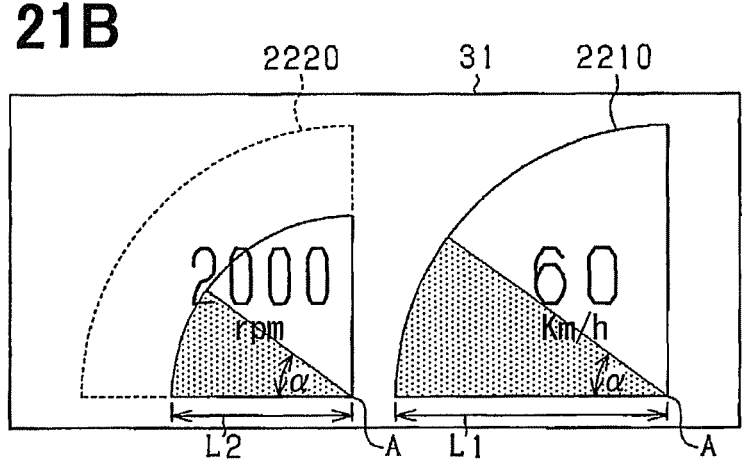
FIG. 21B is another modified example of the display area in the display panel, in a case where the drawing images are differentiated.

It may be possible to configure the third display area and the fourth display area in the display panel 31, as described in FIG. 21A and FIG. 21B. In FIG. 21A and FIG. 21B, a third display area 2210 and a fourth display area 2220 are arranged, which have a quarter circle shape (or a semicircle shape, a fan shape, or the like). The vehicle speed is displayed as the third information on the third display area 2210, and the engine speed is displayed as the fourth information on the fourth display area 2220. In each of the third display area 2210 and the fourth display area 2220, the numerical display image is displayed at a substantial center of each of the third display area 2210 and the fourth display area 2220, and substantial triangle-shaped drawing images (hereinafter, referred to as the drawing image) are displayed in addition to the numerical display image. In this case, according to the vehicle speed or the engine speed, an angle α of a top A in the drawing image changes and the angle α increases as the vehicle speed or the engine speed increases.

In FIG. 21A, display ranges, which can display the drawing images in the third display area 2210 and the fourth display area 2220, have the same size (the same side length) and a side length in the third display area 2210 and the fourth display area 2220 corresponds to L1. According to the traveling state of the vehicle (e.g., the high-speed traveling state or not), the sizes of display ranges, which can display the drawing image, in the third display area 2210 and the fourth display area 2220 are differentiated (incidentally, the size and the position of the numerical display images is constant, as described above). Thus, in FIG. 21B, the sizes (i.e., the side lengths) of the drawing images are different in the third display area 2210 and the fourth display area 2220, and the side length of the third display area 2210 corresponds to L1 and the side length of the fourth display area 2220 corresponds to L2.

In the above embodiment, the display panel 31 is arranged in front of the driver seat. The display panel 31 may be arranged at the center of a dashboard of the vehicle, for example.

In the above embodiment, the third display area 2110 and the fourth display area 2120 in the display panel 31 are arranged from side to side. The third display area 2110 and the fourth display area 2120 may be arranged up and down.

A vehicle display apparatus comprises a display panel that is placed at a position where a driver visually recognizes the display panel, and that displays information related to a vehicle traveling status. The display panel includes a first display area for constantly displaying a first information, which is provided by a numerical value, and a second display area for displaying a second information, which is different from the first information, the second information having a display content that changes according to a display request when a vehicle travels, and the second display area being arranged to be partially overlapped with the first display area. The vehicle display apparatus further comprises a first display control portion for obtaining the first information, controlling the first display area to fixedly display the first information at a predetermined position in a predetermined size by a numerical display image indicative of the numerical value, and controlling the first display area to subsidiary display a drawing image at a position which is adjacent to the numerical display image and is an outer peripheral portion of the first display area, and a second display control portion for obtaining the second information and displaying the second information at the second display area.

The second display control portion determines whether a display range of the second display area includes an overlapped portion which overlaps with the first display area. The second display control portion displays the second information within the display range of the second display area. The first display control portion, in a case where the display range of the second display area includes the overlapped portion, shrinks and displays the drawing image in the first display area so that the drawing image does not overlap with the display range of the second display area that includes the overlapped portion.

In the above vehicle display system, the first information is continuously displayed on the first display area during vehicle traveling. Especially, the first information is displayed as the numerical display image, and is displayed as a drawing image. According to this feature, it is possible that the driver correctly recognizes the first information by the numerical display image, and intuitively recognizes the first information by the drawing image at a glance. Thus, it is possible to improve the visibility in the display panel. Since the numerical display image is displayed on a predetermined position with a predetermined size, it is possible that the driver finds out the numerical display image immediately when the driver's eyes are moved from a front of the vehicle to the display panel.

A display content of the second information changes according to the display request occurred during vehicle traveling. The second information is displayed on the second display area. Furthermore, by using the overlapped portion which overlaps with the first display area, it is possible to enlarge and display the second information. In a case where the second information is enlarged and displayed, the drawing image, which represents the first information, shrinks and is displayed so that the first information does not overlap with the second information.

In this case, regarding to the first information, only the drawing image, which is subsidiary displayed, shrinks. The numerical display image, which is displayed in a fixed manner, does not change. Thus, it is possible to appropriately display the first information and, the second information with using the limited display area of the display panel effectively. In this case, since a display mode of the numerical display image does not change, the visibility to the driver is assured. Although the drawing image shrinks and is displayed, it is possible for the driver to recognize the first information intuitively according to the size of the display image. Thus, it is possible that, in a case where the image of the second information is enlarged and displayed, the visibility of the image for representing the first information is assured and maximized.

The vehicle display apparatus in the present disclosure includes a display panel that is placed at a position where a driver visually recognizes the display panel and that displays information related to a vehicle traveling status. The display panel includes a third display area for displaying third information, and a fourth display area for displaying fourth information which is different from the third information, the third display area and the fourth display area being arranged adjacently. The third information and the fourth information are displayed by a numerical value. The fourth information includes a plurality of information items whose contents are different from each other. At least one of the plurality of information items is displayed within the fourth display area. The third information is represented within a first display range of the third display area. The fourth information is represented within a second display range of the fourth display area.

The vehicle display apparatus further includes a third display control portion for obtaining the third information, controlling the third display area to display a first numerical display image indicative of a numerical value of the third information, and controlling the third display area to display a first drawing image whose display mode changes according to the numerical value of the third information. The vehicle display apparatus further includes a fourth display control portion for obtaining the at least one of the plurality of information items displayed within the fourth display area, controlling the fourth display area to display the second numerical display image indicative of a numerical value of the fourth information, and controlling the fourth display area to display a second drawing image whose display mode changes according to the numerical value of the fourth information. According to a combination of the third information and the fourth information, a differentiation portion differentiates a size of the first display range where the first drawing image is displayed and a size of the second display range where the second drawing image is displayed.

The above vehicle display apparatus displays the third information on the third display area and displays the fourth information on the fourth display area. In the third display area and the fourth display area of the display panel, the third information and the fourth information are displayed as the numerical display images and also displayed as the drawing images. According to this feature, it is possible that the driver correctly recognizes the third information and the fourth information through the numerical display images, and intuitively recognizes the third information and the fourth information through the drawing images at a glance. It is possible to improve the visibility of the display panel.

According to a combination of the displayed contents of the third information and the fourth information, the size of the display range of the drawing image of the third information in the third display area and the size of the display range of the drawing image of the fourth information in the fourth display area are differentiated. In this case, even when multiple images, representing multiple information items, are displayed on the display panel from side to side, it is possible to differentiate the sizes of the display range of the drawing image and therefore it is possible to easily distinguish the images.

The vehicle display apparatus in the present disclosure may be configured from a vehicle display control unit and a display panel, for example. In this case, the vehicle control unit performs the substantially same function performed by the vehicle display apparatus except for the display panel.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle display apparatus comprising,
a display panel that is placed at a position where a driver visually recognizes the display panel, and that displays information related to a vehicle traveling status, wherein the display panel includes:
   a first display area constantly displaying a first information, which is provided by a numerical value; and
   a second display area displaying a second information, which is different from the first information, the second information having a display content that changes according to a display request when a vehicle travels, and the second display area being arranged to be partially overlapped with the first display area,
the vehicle display apparatus further comprises:
   a first display controller receiving the first information, controlling the first display area including a numerical display image indicative of the numerical value and a drawing image, wherein the numerical display image fixedly displays the first information at a predetermined position in a predetermined size, and the drawing image displays the first information at a position which is adjacent to the numerical display image and is an outer peripheral portion in the first display area; and
   a second display controller receiving the second information and causing the second display area to display the second information,
the second display controller determines a display range of the second display area, and determines whether or not the display range of the second display area includes an overlapped portion which overlaps with the first display area, wherein
the second display controller displays the second information within the display range of the second display area,
the first display controller, in a case where the display range of the second display area includes the overlapped portion, shrinks and displays the drawing image in the first display area without changing the numerical display image, so that the drawing image in the first display area does not overlap with the display range of the second display area which includes the overlapped portion; and
in a case where a width of the drawing image changes, the width of the drawing image becomes narrower from an outer peripheral side more than from an inner peripheral side.

2. The vehicle display apparatus according to claim 1, wherein
the first display area includes a first area and a second area, the first area displaying the numerical display image, and the second area displaying the drawing image at a position which surrounds the first area,
the drawing image is a belt-shaped image whose display mode changes according to the numerical value of the first information, and
the first display controller shrinks and displays the drawing image so that the drawing image does not overlap with the second information by changing a width of the belt-shaped image.

3. The vehicle display apparatus according to claim 2, wherein
the second area includes the inner peripheral side and the outer peripheral side,
the outer peripheral side surrounds the inner peripheral side.

4. The vehicle display apparatus according to claim 3, wherein
the first area displaying the numerical display image has a circular shape.

5. The vehicle display apparatus according to claim 1, further comprising a traveling state detection portion detecting a traveling state of the vehicle, wherein
the traveling state detection portion detects the traveling state of the vehicle, and
the second display controller, based on the traveling state of the vehicle, determines whether the display range of the second display area includes the overlapped portion.

6. The vehicle display apparatus according to claim 1, wherein
the second information includes a plurality of information items whose contents are different from each other, and
according to a content of one of the plurality of information items to be displayed, the second display controller determines whether the display range of the second display area includes the overlapped portion.

7. The vehicle display apparatus according to claim 1, wherein the first information is a vehicle speed information.

8. The vehicle display apparatus according to claim 7, wherein
the second information includes a night-vision image in front of the vehicle, and
the second display controller, in a case where the night-vision image is displayed as the second information, displays the second information within the display range of the second display area that includes the overlapped portion.

9. The vehicle display apparatus according to claim 1, wherein
the second information includes a night-vision image in front of the vehicle,
in a case where an obstacle exists in front of the vehicle and the obstacle is detected in the night-vision image, the second display controller enlarges and displays the night-vision image so that the display range of the second information includes the overlapped portion, and
according to a size of the night-vision image, the first display controller controls a size of the drawing image so that the drawing image does not overlap with the night-vision image.

10. The vehicle display apparatus according to claim 1, wherein according to the numerical value displayed as the numerical display image, the first display controller changes color or brightness of the drawing image.

11. The vehicle display apparatus according to claim 1, wherein in a case where the second information is displayed within the display range of the second display area that includes the overlapped portion, the first display controller shrinks and displays the drawing image so that the drawing image does not overlap with the overlapped portion, and changes color or brightness of the drawing image according to an extent of shrinkage of the drawing image.

12. A vehicle display apparatus comprising, a display panel that is placed at a position where a driver visually recognizes the display panel and that displays information related to a vehicle traveling status, wherein the display panel includes a first display area displaying a first information, and a second display area displaying a second information which is different from the first information, the first display area and the second display area being arranged adjacently, the first information and the second information are displayed by a numerical value, the second information includes a plurality of information items whose contents are different from each other, at least one of the plurality of information items is displayed within the second display area, the first information is represented within a first display range of the first display area, the second information is represented within a second display range of the second display area the vehicle display apparatus further comprises:

a first display controller receiving the first information, controlling the first display area to display a first numerical display image indicative of a numerical value of the first information, and controlling the first display area to display a first drawing image whose display mode changes according to the numerical value of the first information;

a second display controller receiving the at least one of the plurality of information items displayed within the second display area, controlling the second display area to display a second numerical display image indicative of a numerical value of the second information, and controlling the second display area to display a second drawing image whose display mode changes according to the numerical value of the second information; and a differentiation portion differentiating a size of the first display range, where the first drawing image is displayed, and a size of the second display range, where the second drawing image is displayed, according to a combination of the first information and the second information, wherein:

when the differentiation portion differentiates the size of the first display range and the size of the second display range, the size of the first display range is different from the size of the second display range, and the first numerical display image and the second numerical display image are not changed;

each of the first numerical display image and the second numerical display image is displayed at a predetermined position in a predetermined size; and in a case where a width of the first drawing image changes, the width of the first drawing image becomes narrower from an outer peripheral side more than from an inner peripheral side.

13. The vehicle display apparatus according to claim 12, wherein the differentiation portion does not change a size and a position of the first numerical display image in the first display area, the differentiation portion does not change a size and a position of the second numerical display image in the fourth second display area, and the differentiation portion differentiates the size of the first display range for the first drawing image and the size of the second display range for the second drawing image.

14. The vehicle display apparatus according to claim 12, further comprising a traveling state determination portion determining a traveling state of a vehicle, wherein the differentiation portion, based on the traveling state of the vehicle, differentiates the size of the first display range and the size of the second display range.

15. The vehicle display apparatus according to claim 12, wherein the differentiation portion, in a case where the size of the first display range and the size of the second display range are differentiated, changes size ratios of the size of the first display range and the size of the second display range.

16. The vehicle display apparatus according to claim 12, wherein a traveling mode of a vehicle includes a normal mode and a fuel-efficiency mode, in the fuel-efficiency mode, a fuel efficiency of the vehicle is improved compared with the normal mode, the second information includes fuel efficiency information, and the differentiation portion, in a case where the second information represents the fuel efficiency information and the vehicle is in the fuel-efficiency mode, enlarges the second display range of the second display area more than the first display range of the first display area.

17. The vehicle display apparatus according to claim 12, wherein the display panel further includes a third display area displaying a third information which is different from the first information and the second information, the third display area is arranged to be partially overlapped with the first display area, the third display area is arranged to be partially overlapped with the fourth second display area, the vehicle display apparatus further comprises a third display controller receiving the third information according to a display request and controlling the third display area to display the third information, the third display controller determines according to the display request whether the fifth information is displayed, the first display controller, in a case where the third information is displayed within the third display area, shrink the first display range of the first display area, so that a third drawing image of the third information displayed within an overlapped portion which overlaps with the first display area does not overlap with the first display range of the first display area, and the second display controller, in a case where the third information is displayed within the third display area, shrink the second display range of the second display area, so that the third drawing image of the third information displayed within another overlapped portion which overlaps with the second display area does not overlap with the second display range of the second display area.

18. The vehicle display apparatus according to claim 17, wherein in a case where the third information is displayed within the third display area, the differentiation portion adjusts the size of the first display range of the first display area to be an initial size of the first display range of the first display area, and the differentiation portion adjusts the size of the second display range of the second display area to be an initial size of the second display range of the second display area.

19. The vehicle display apparatus according to claim 12, wherein the first information includes vehicle speed information, and the second information includes an engine speed information and a fuel efficiency information.

20. A vehicle display control unit for a display panel that is placed at a position where a driver visually recognizes the display panel, and that displays information related to a vehicle traveling status, the vehicle display control unit comprising:

means for setting a first display area on the display panel displaying a first information, which is provided by a numerical value;

means for setting a second display area on the display displaying a second information, which is different from the first information, the second information having a display content that changes according to a display request when a vehicle travels, and the second display area being arranged to be partially overlapped with the first display area;

a first display controller receiving the first information, controlling the first display area including a numerical display image indicative of the numerical value and a drawing image, wherein the numerical display image fixedly displays the first information at a predetermined position in a predetermined size, and the drawing image displays the first information at a position which is adjacent to the numerical display image and is an outer peripheral portion in the first display area; and a second display controller receiving the second information and causing the second display area to display the second information, wherein the second display controller determines a display range of the second display area and determines whether or not the display range of the second display area includes an overlapped portion which overlaps with the first display area, the second display controller displays the second information within the display range of the second display area, and the first display controller, in a case where the display range of the second display area includes the overlapped portion, shrinks and displays the drawing image in the first display area without changing the numerical display image, so that the drawing image in the first display area does not overlap with the display range of the second display area which includes the overlapped portion; and in a case where a width of the drawing image changes, the width of the drawing image becomes narrower from an outer peripheral side more than from an inner peripheral side.

21. The vehicle display control unit according to claim 20, wherein the first display area includes a first area and a second area, the first area displaying the numerical display image, and the second area displaying the drawing image at a position which surrounds the first area, the drawing image is a belt-shaped image whose display mode changes according to the numerical value of the first information, and the first display controller shrinks and displays the drawing image so that the drawing image does not overlap with the second information by changing a width of the belt-shaped image.

22. The vehicle display control unit according to claim 21, wherein the second area includes an inner peripheral side and an outer peripheral side, the outer peripheral side surrounds the inner peripheral side, and in a case where the width of the belt-shaped image changes, the width of the belt-shaped image becomes narrower from the outer peripheral side more than from the inner peripheral side.

* * * * *